US012206855B2

United States Patent
Yea et al.

(10) Patent No.: US 12,206,855 B2
(45) Date of Patent: Jan. 21, 2025

(54) SUPERRESOLUTION-BASED CODING

(71) Applicant: Tencent America LLC, Palo Alto, CA (US)

(72) Inventors: Sehoon Yea, Palo Alto, CA (US); Madhu Peringassery Krishnan, Mountain View, CA (US); Xin Zhao, Santa Clara, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/482,018

(22) Filed: Sep. 22, 2021

(65) Prior Publication Data
US 2022/0201307 A1    Jun. 23, 2022

Related U.S. Application Data

(60) Provisional application No. 63/130,265, filed on Dec. 23, 2020.

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/176* (2014.11); *H04N 19/33* (2014.11); *H04N 19/60* (2014.11)

(58) Field of Classification Search
None
See application file for complete search history.

(56) References Cited

U.S. PATENT DOCUMENTS

2007/0189392 A1    8/2007  Tourapis et al.
2008/0165848 A1*   7/2008  Ye ........................ H04N 19/30
                                                      375/E7.17
(Continued)

FOREIGN PATENT DOCUMENTS

JP     2013541276 A     11/2013

OTHER PUBLICATIONS

International Search Report and Written Opinion issued Feb. 4, 2022 in PCT/US 21/53392, citing reference AA therein, 13 pages.
(Continued)

*Primary Examiner* — Chikaodili E Anyikire
(74) *Attorney, Agent, or Firm* — ArentFox Schiff LLP

(57) ABSTRACT

Aspects of the disclosure provide methods and apparatuses for video encoding and decoding. Processing circuitry of an apparatus for video decoding decodes coded information for one or more blocks from a coded video bitstream. The coded information indicates whether to apply a super resolution coding mode to the one or more blocks. The super resolution coding mode is applied in response to the one or more blocks having been down sampled from a high spatial resolution to a low spatial resolution lower than the high spatial resolution by an encoder. Based on the coded information indicating that the super resolution coding mode is applied to the one or more blocks, the processing circuitry can generate, using the super resolution coding mode, a reconstructed block having the high spatial resolution by upsampling information of a first block having the low spatial resolution in the one or more blocks including transform coefficients.

14 Claims, 22 Drawing Sheets

(51) Int. Cl.
*H04N 19/176* (2014.01)
*H04N 19/33* (2014.01)
*H04N 19/60* (2014.01)

(56) References Cited

U.S. PATENT DOCUMENTS

| | | | | |
|---|---|---|---|---|
| 2008/0192825 | A1* | 8/2008 | Lee | H04N 19/48 375/240.12 |
| 2010/0239002 | A1* | 9/2010 | Park | H04N 19/115 375/E7.243 |
| 2012/0044990 | A1* | 2/2012 | Bivolarsky | H04N 19/61 375/240.03 |
| 2014/0072045 | A1* | 3/2014 | Nomura | H04N 19/513 375/240.16 |
| 2021/0099722 | A1* | 4/2021 | Da Silva Pratas Gabriel | G06T 9/002 |
| 2021/0104019 | A1* | 4/2021 | Chujoh | G06T 5/50 |
| 2021/0211643 | A1* | 7/2021 | Da Silva Pratas Gabriel | H04N 19/46 |

OTHER PUBLICATIONS

Supplementary European Search Report issued Mar. 30, 2023 in 21911819.7, 9 pages.
Lin Jianping et al: "Convolutional Neural Network-Based Block Up-Sampling for HEVC", IEEE Transactions on Circuits and Systems for Video Technology, IEEE, USA, vol. 29, No. 12, Dec. 1, 2019, pp. 3701-3715.
W. Lin et al: "Adaptive downsampling to improve image compression at low bit rates", IEEE Transactions on Image Processing, vol. 15, No. 9, Sep. 1, 2006, pp. 2513-2521.
B. Bross, J. Chen, S. Liu, Y. K. Wang, "Versatile Video Coding (Draft 8)", ISO/IEC JTC1/SC29/WG11 JVET-Q2001, Jan. 2020, pp. 1-510.
J. Taquet, P. Onno, C. Gisquet, G. Laroche, "CE5: Results of tests CE5-3.1, CE5-3.2, CE5-3.3 and CE5-3.4 on Non- Linear Adaptive Loop Filter.", ISO/IEC JTC1/SC29/WG11 JVET-N0242-v2, Mar. 2019, pp. 1-10.
C. Tsai, C. Fu, C. Chen, Y. Huang, S. Lei, "TE10 Subtest2: Coding Unit Synchronous Picture Quadtree-based Adaptive Loop Filter", ITU-T SG16 WP3 and ISO/IEC JTC1/SC29/WG11 JCTVC-C143, Oct. 2010, pp. 1-12.
K. Misra, F. Bossen, A. Segall, "Cross-Component Adaptive Loop Filter for chroma", ISO/IEC JTC1/SC29/WG11 JVET O-0636-r1, Jul. 2019, pp. 1-9.
K. Misra, F. Bossen, A. Segall, ect, "CE5-related: On the design of CC-ALF", ISO/IEC JTC1/SC29/WG11 JVET-P1008-v2, Oct. 2019, pp. 1-6.
S. Midtskogen, and J.-M. Valin. "The AV1 constrained directional enhancement filter (CDEF)." In 2018 IEEE International Conference on Acoustics, Speech and Signal Processing (ICASSP), pp. 1193-1197. IEEE, 2018.
Daede, Thomas J., Nathan E. Egge, Jean-Marc Valin, Guillaume Martres, and Timothy B. Terriberry. "Daala: A perceptually-driven next generation video codec." arXiv preprint arXiv: 1603.03129 (2016), pp. 1-10.
S. Midtskogen, A. Fuldseth, G. Bj, and T. Davies. "Integrating Thor tools into the emerging AV1 codec." In 2017 IEEE International Conference on Image Processing (ICIP), pp. 930-933. IEEE, 2017.
D. Mukherjee, S. Li, Y. Chen, A. Anis, S. Parker, and J. Bankoski. "A switchable loop-restoration with side-information framework for the emerging AV1 video codec." In 2017 IEEE International Conference on Image Processing (ICIP), pp. 265-269. IEEE, 2017.
U. Joshi, D. Mukherjee, Y. Chen, S. Parker, A. Grange. "In-loop Frame Super-resolution in AV1." In 2019 Picture Coding Symposium (PCS), IEEE, 2019, pp. 1-5.
Japanese Office Action issued Nov. 13, 2023 in 2022-554886, 10 pages.

* cited by examiner

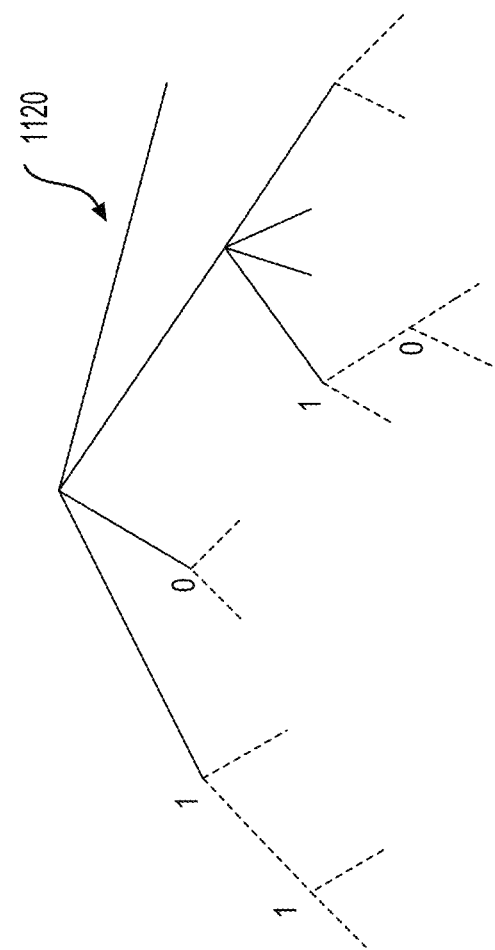
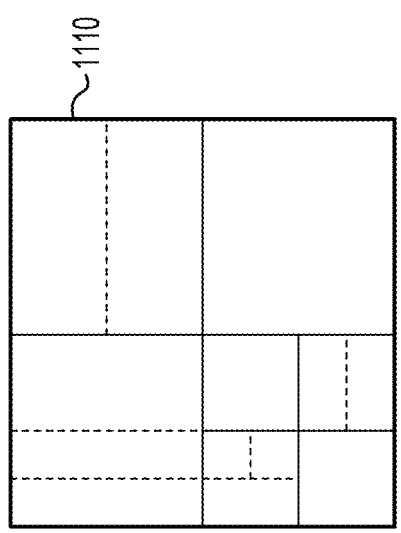
FIG. 11A
FIG. 11B

SUPERRESOLUTION-BASED CODING

INCORPORATION BY REFERENCE

This disclosure claims the benefit of priority to U.S. Provisional Application No. 63/130,265, entitled "SUPERRESOLUTION-BASED CODING", filed on Dec. 23, 2020, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and decoding. In some examples, an apparatus for video decoding includes processing circuitry. The processing circuitry can decode coded information for one or more blocks from a coded video bitstream. The coded information can indicate whether to apply a super resolution coding mode to the one or more blocks. The super resolution coding mode can be applied in response to the one or more blocks having been down sampled from a high spatial resolution to a low spatial resolution by an encoder. Based on the coded information indicating that the super resolution coding mode is applied to the one or more blocks, the processing circuitry can generate, using the super resolution coding mode, a reconstructed block by upsampling information of a first block in the one or more blocks. The first block has the low spatial resolution, and the reconstructed block has the high spatial resolution higher than the low spatial resolution. The one or more blocks can include transform coefficients, and the reconstructed block can include sample values in a spatial domain.

In an embodiment, the one or more blocks are coding blocks (CBs), coding units (CUs), prediction blocks (PBs), or transform blocks (TBs), and the coded information indicates whether to apply the super resolution coding mode to each of the one or more blocks.

In an embodiment, the coded information indicates whether to apply the super resolution coding mode to a coding unit (CU), a coding block (CB), a superblock, a prediction block (PB), a transform block (TB), a tile, a coded-segment, a frame, or a sequence that includes the one or more blocks.

In an embodiment, the processing circuitry can inversely transform the first block into a down-sampled residual block having the low spatial resolution.

In an example, the processing circuitry obtains a down-sampled reference block by down-sampling a reference block for the first block where the reference block and the down-sampled reference block have the high spatial resolution and the low spatial resolution, respectively. The processing circuitry generates a down-sampled reconstructed block based on the down-sampled residual block and the down-sampled reference block where the down-sampled reconstructed block has the low spatial resolution. The processing circuitry can generate the reconstructed block by up-sampling the down-sampled reconstructed block.

In an example, the processing circuitry obtains a residual block by up-sampling the down-sampled residual block where the residual block has the high spatial resolution. The processing circuitry can generate the reconstructed block based on the obtained residual block and a reference block for the first block where the reference block has the high spatial resolution.

In an embodiment, the one or more blocks are a subset of blocks in a current picture to be reconstructed, and the super resolution coding mode is not applied to a block in the current picture that is different from the one or more blocks.

In some examples, an apparatus for video encoding includes processing circuitry. The processing circuitry can determine whether to apply a super resolution coding mode to a first block in a video. The first block can include sample values in a spatial domain and have a high spatial resolution. Based on the super resolution coding mode being determined to be applied to the first block, the processing circuitry in the apparatus for video encoding can generate a down-sampled coefficient block based on the first block using the super resolution coding mode where the down-sampled coefficient block includes transform coefficients and has a low spatial resolution that is lower than the high spatial resolution. The processing circuitry in the apparatus for video encoding can encode information for the first block in a video bitstream where the encoded information indicates that the super resolution coding mode was applied to the first block.

In an embodiment, the first block is a coding block (CB), a coding unit (CU), a prediction block (PB), or a transform block (TB).

In an embodiment, the encoded information indicates that the super resolution coding mode was applied to a coding unit (CU), a coding block (CB), a superblock, a prediction block (PB), a transform block (TB), a tile, a coded-segment, a frame, or a sequence that includes the first block.

In an embodiment, the processing circuitry in the apparatus for video encoding generates a down-sampled residual block based on the first block and a reference block for the first block. The reference block has the high spatial resolution. The down-sampled residual block includes residual values and has the low spatial resolution. The processing circuitry in the apparatus for video encoding transforms the down-sampled residual block to obtain the down-sampled coefficient block.

In an example, the processing circuitry in the apparatus for video encoding down-samples the first block to obtain a down-sampled block having the low spatial resolution and down-samples the reference block to obtain a down-sampled reference block having the low spatial resolution. Further, the processing circuitry in the apparatus for video encoding generates the down-sampled residual block based on the down-sampled block and the down-sampled reference block.

In an example, the processing circuitry in the apparatus for video encoding generates a residual block based on the first block and the reference block where the residual block has the high spatial resolution. The processing circuitry in the apparatus for video encoding down-samples the residual block to obtain the down-sampled residual block.

Aspects of the disclosure also provide non-transitory computer-readable mediums storing instructions which when executed by a computer for video decoding and/or encoding cause the computer to perform the methods for video decoding and/or encoding.

BRIEF DESCRIPTION OF THE DRAWINGS

Further features, the nature, and various advantages of the disclosed subject matter will be more apparent from the following detailed description and the accompanying drawings in which:

FIGS. 11A and 11B show an example of partition techniques used in another video coding format example.

DETAILED DESCRIPTION OF EMBODIMENTS

Figure 1A:
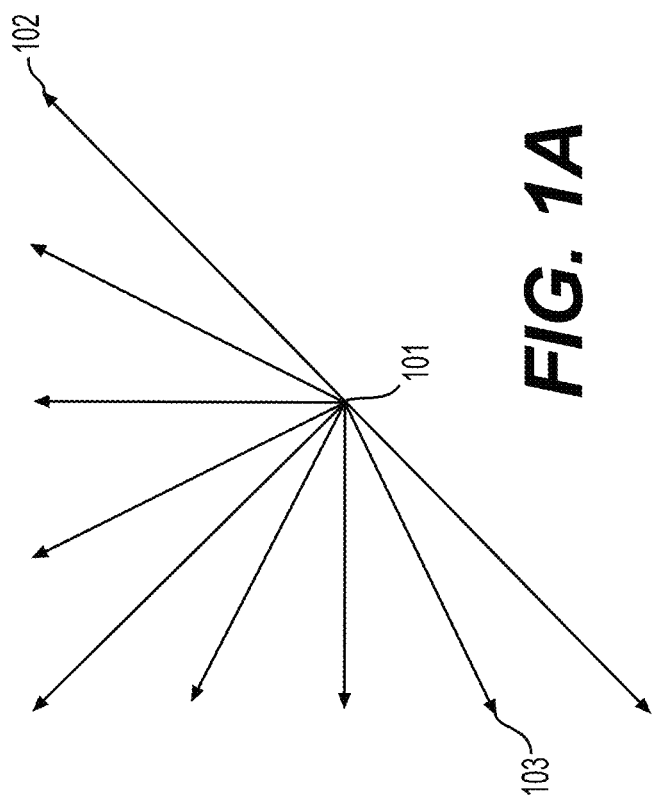
FIG. 1A is a schematic illustration of an exemplary subset of intra prediction modes.
Figure 1A:
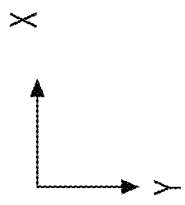
Figure 1B:
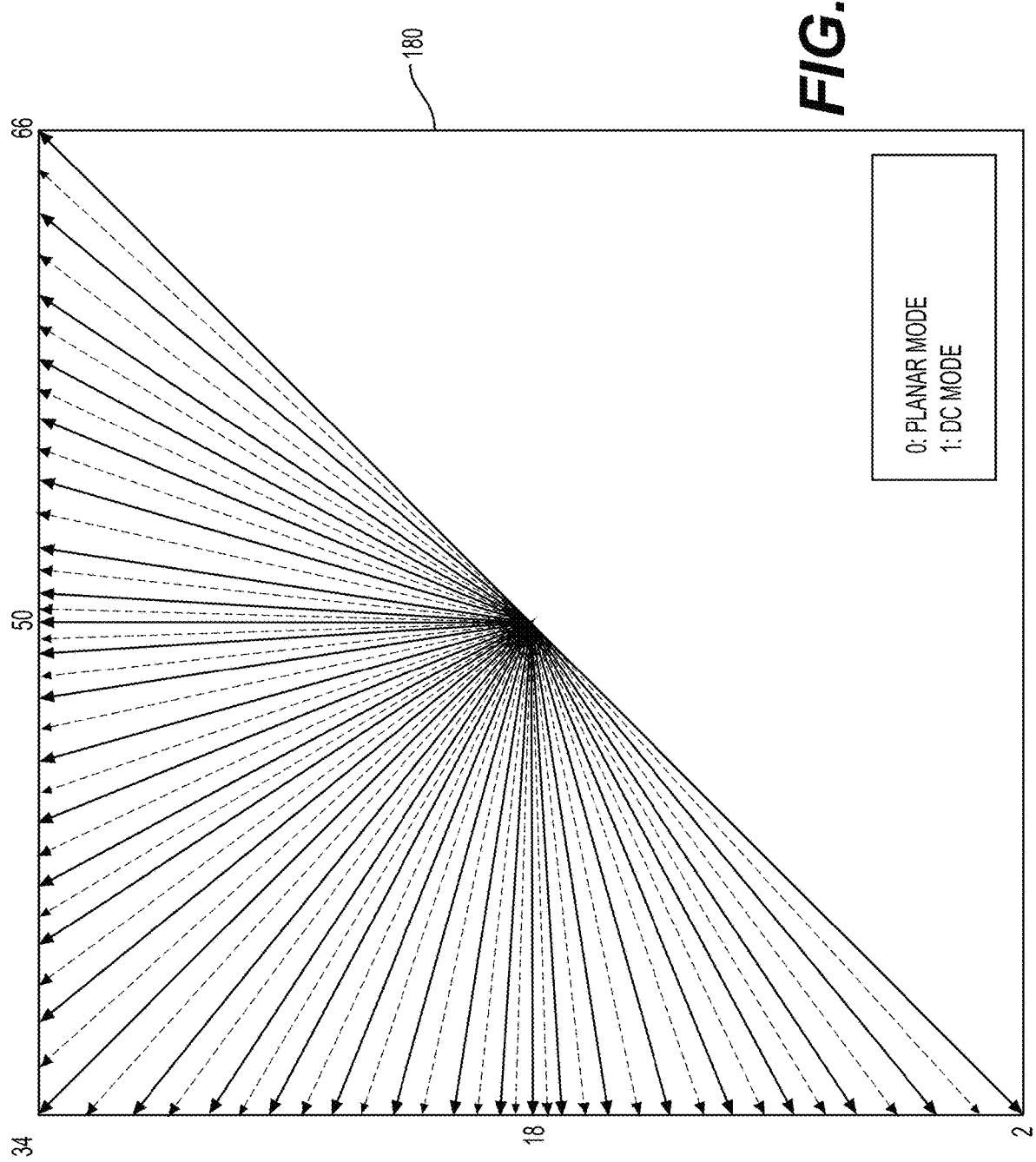
FIG. 1B is an illustration of exemplary intra prediction directions.
Figure 2:
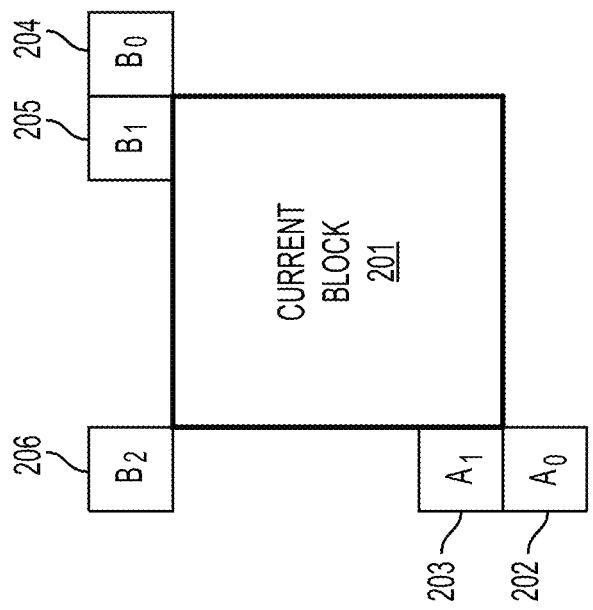
FIG. 2 is a schematic illustration of a current block and its surrounding spatial merge candidates in one example.
Figure 3:
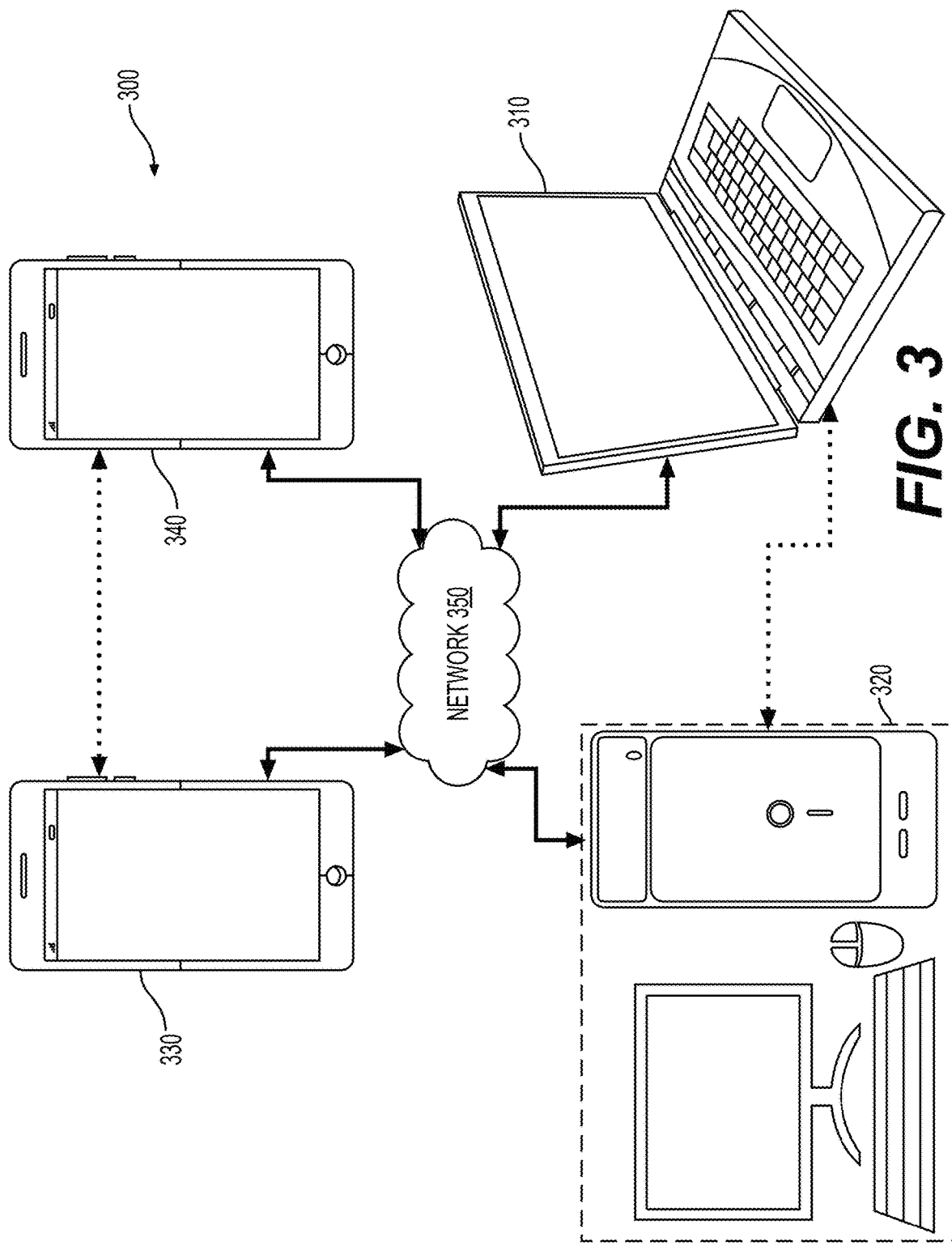
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
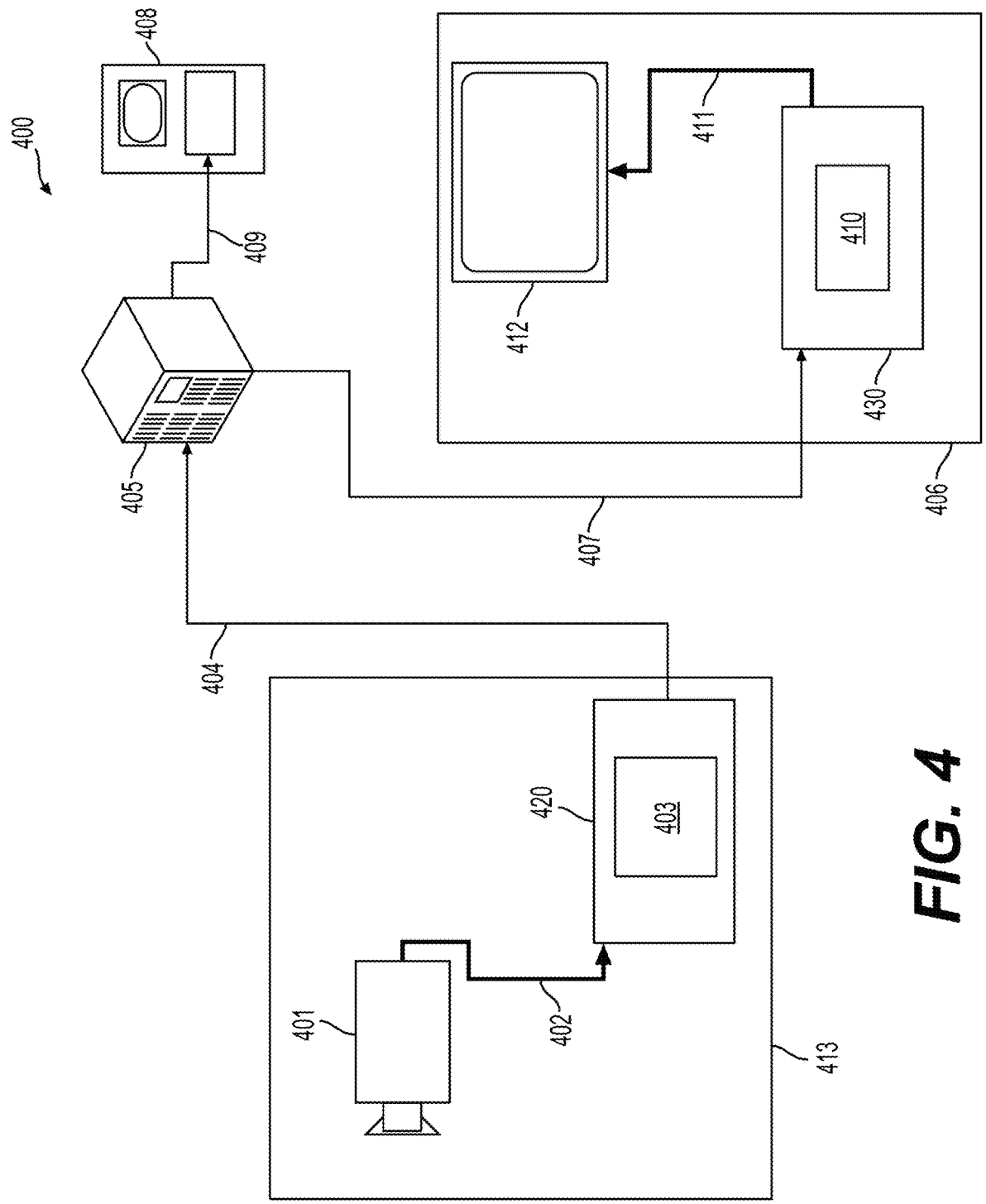
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413) that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
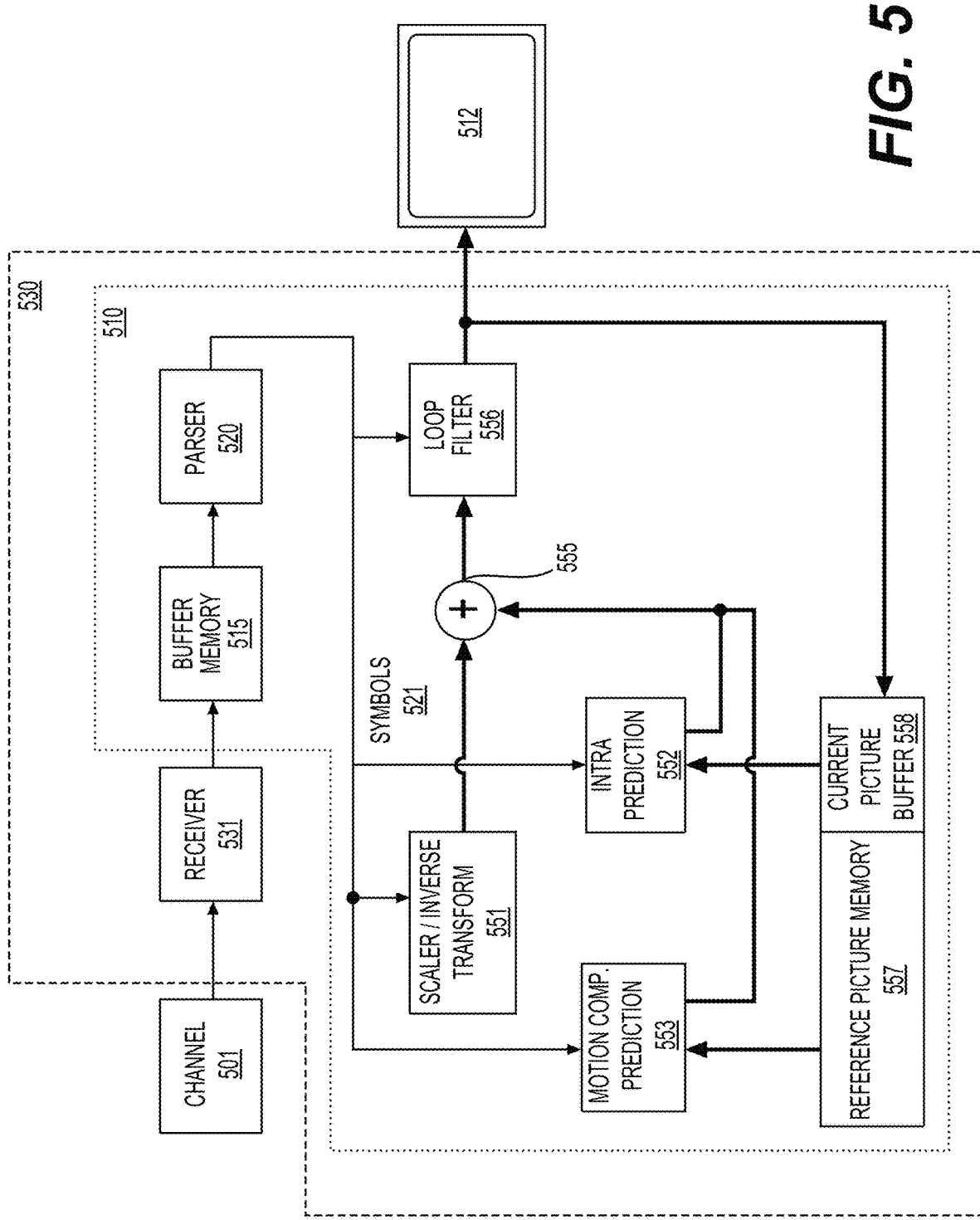
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence is decoded at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
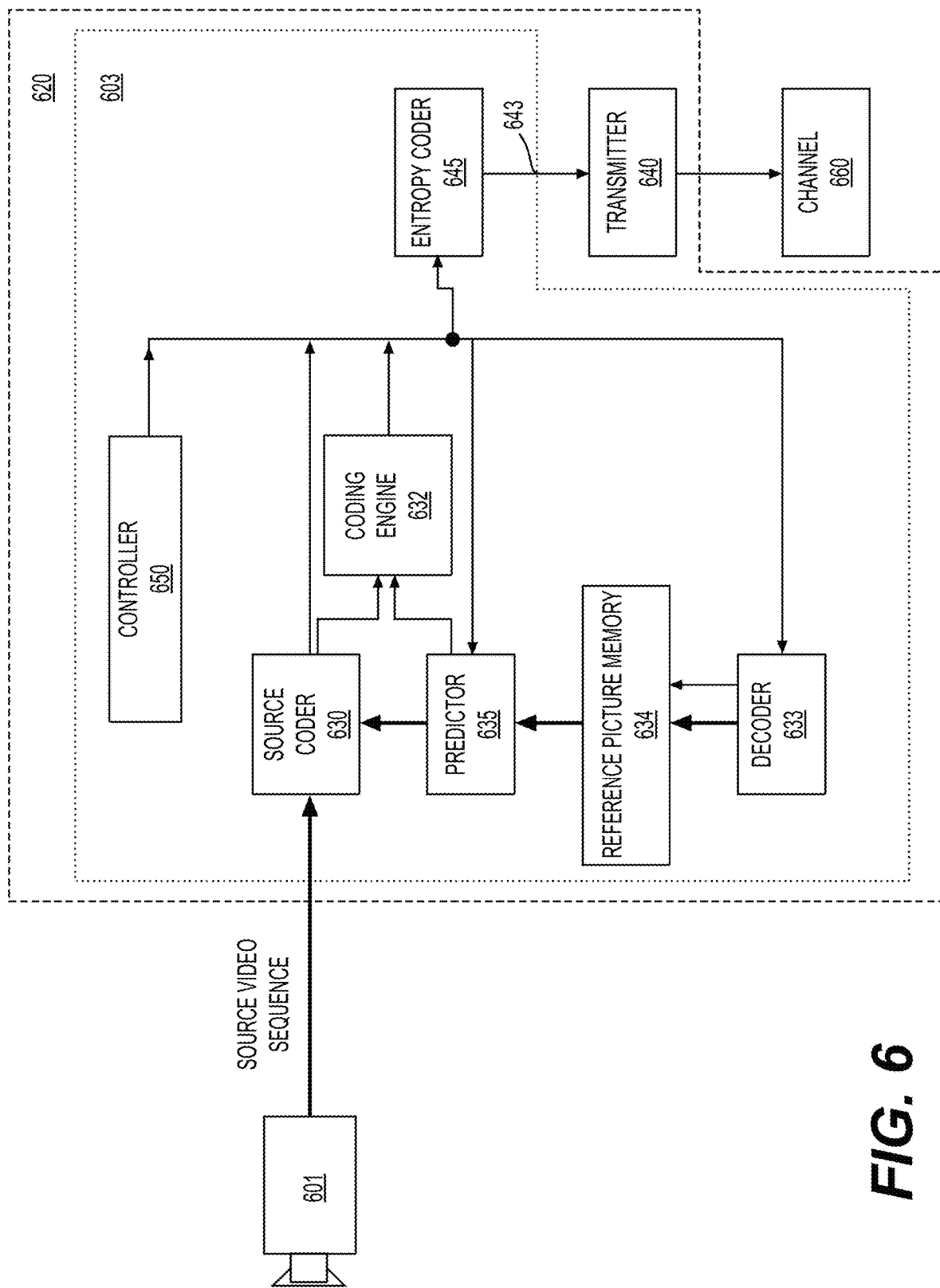
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by losslessly compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
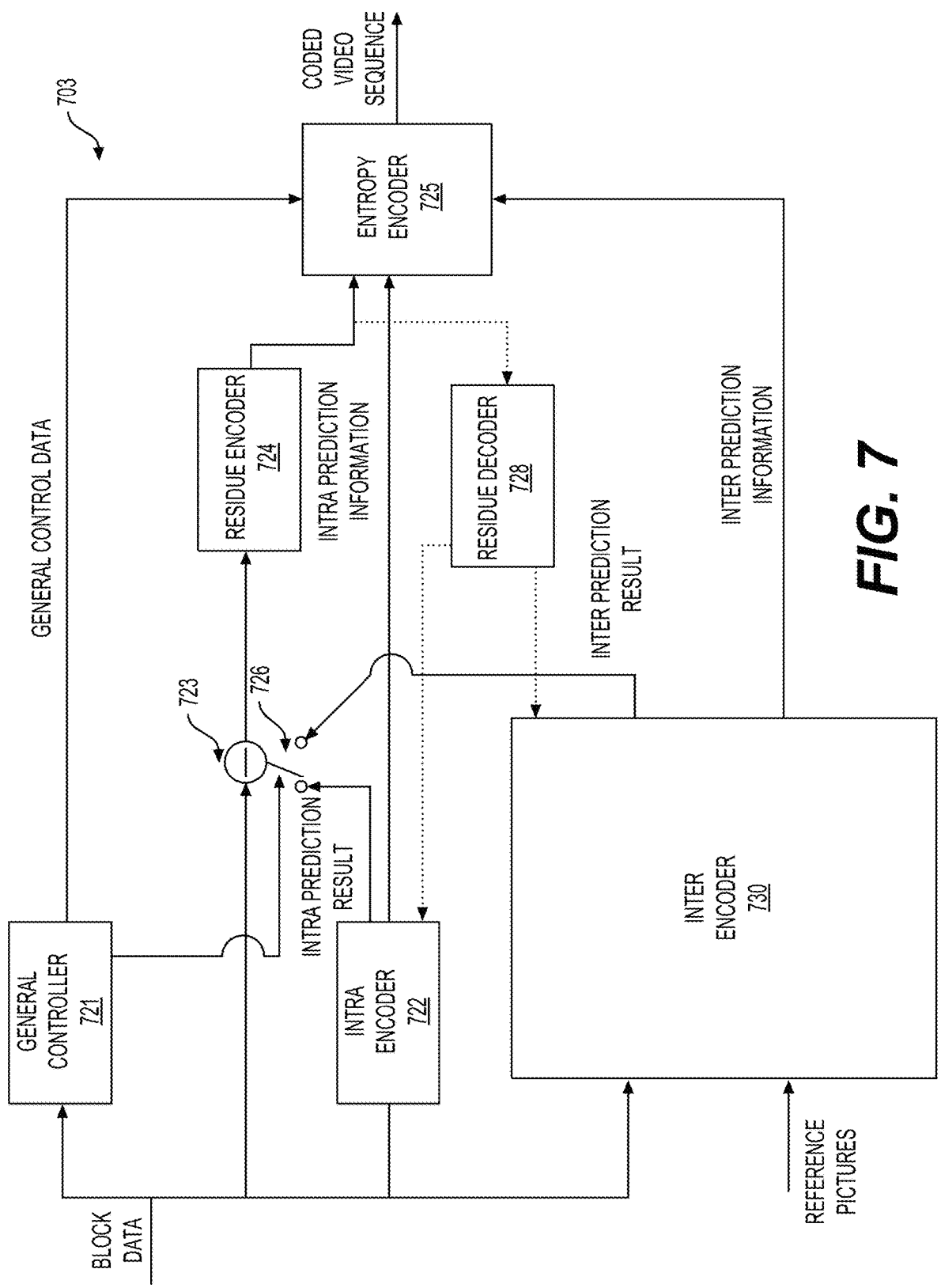
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include in the bitstream various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
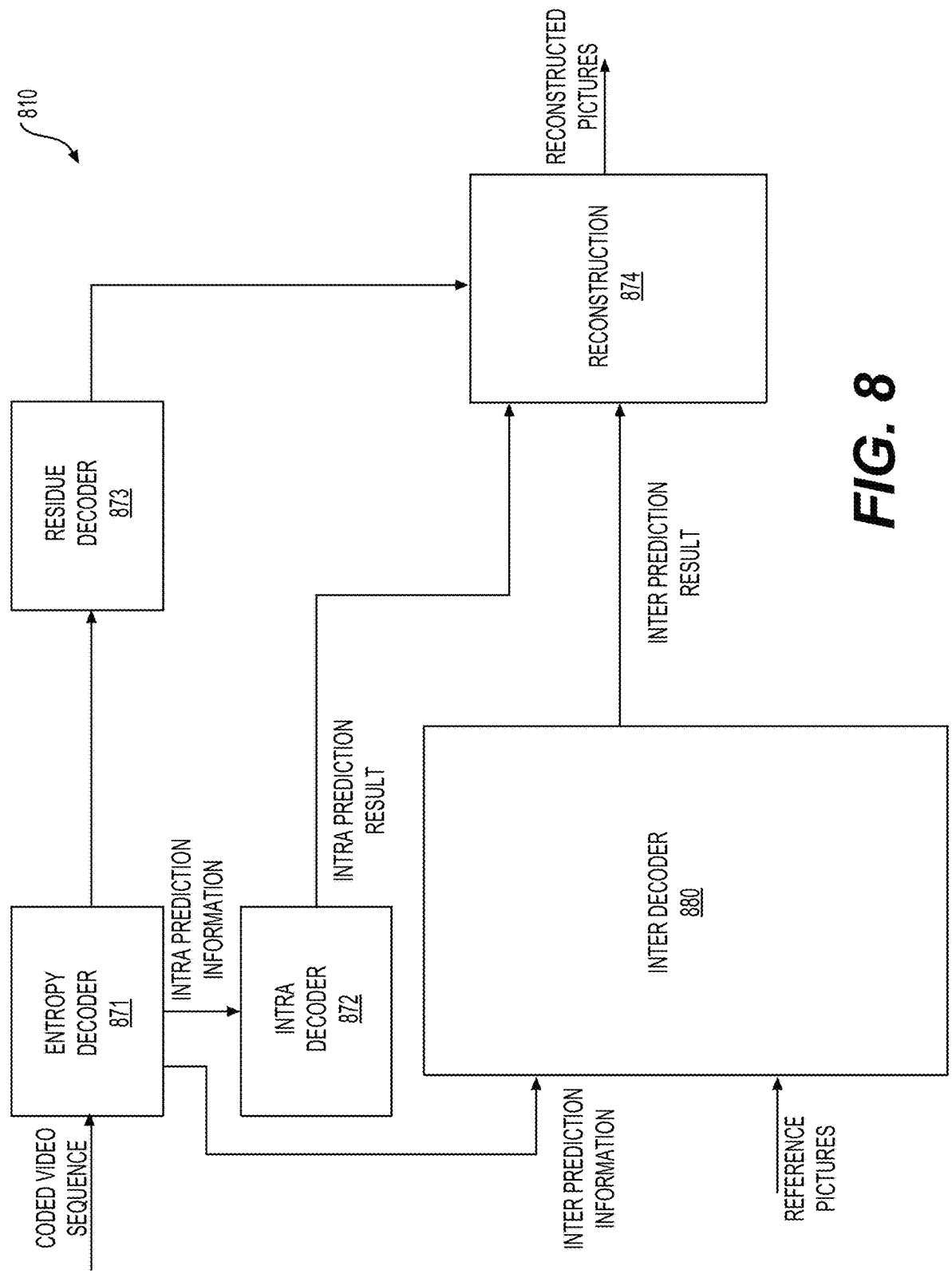
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Video coding technologies related to super resolution based coding, such as adaptive methods of super resolution based coding are disclosed. A video coding format can include any suitable video coding format, for example, an open video coding format designed for video transmissions over the Internet, such as a video coding format Alliance for Open Media (AOMedia) Video 1 (AV1) or a next generation AOMedia Video format beyond the AV1. A video coding standard can include High Efficiency Video Coding (HEVC) standard, a next-generation video coding beyond HEVC (e.g., the Versatile Video Coding (VVC)), or the like.

Generally, a picture or a frame is partitioned into blocks, and blocks can be units for various processing, such as coding, prediction, transformation, and the like. Various block partition techniques can be used.

Figure 9:
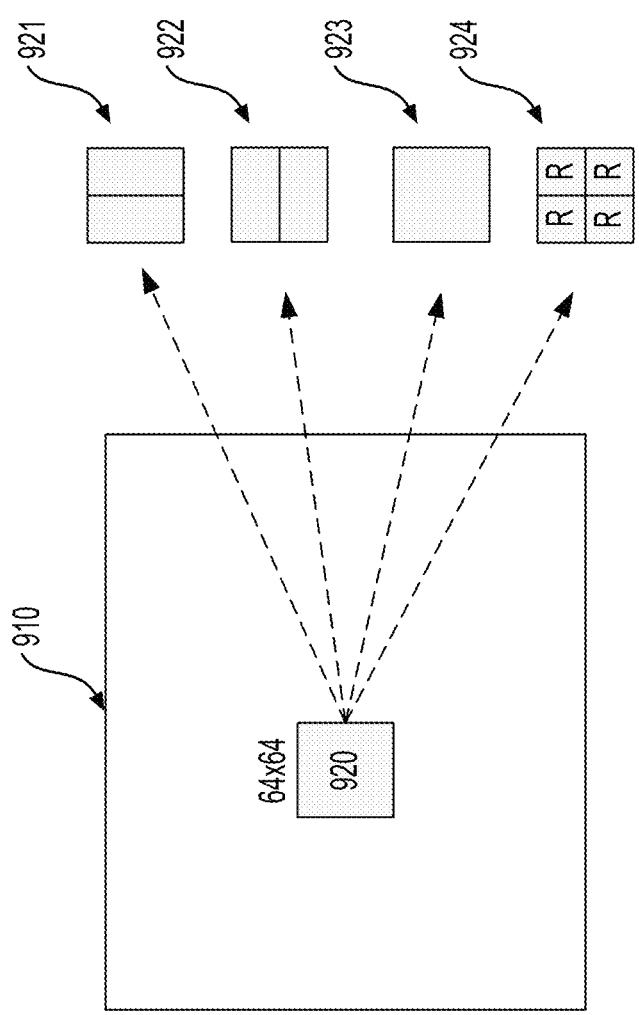
FIG. 9 shows an example of partition techniques used in a video coding format example.

FIG. 9 shows an example of partition techniques used in a video coding format VP9 by the AOMedia. For example, a picture (910) is partitioned into a plurality of blocks (920) of a size 64×64 (e.g., 64 samples×64 samples). Further, a 4-way partition tree can start from a 64×64 level down to smaller blocks, and a lowest level can be a 4×4 level (e.g., a block size of 4 samples×4 samples). In some examples, additional restrictions can be applied for blocks 8×8 and below. In the FIG. 9 examples, a 64×64 block (920) can be partitioned into smaller blocks using one of a first way (921), a second way (922), a third way (923) and a fourth way (924). A partition designated as R (shown in the fourth way (924)) refers to as a recursive partition in that the same partition tree can be repeated at a lower scale until the lowest 4×4 level.

Figure 10:
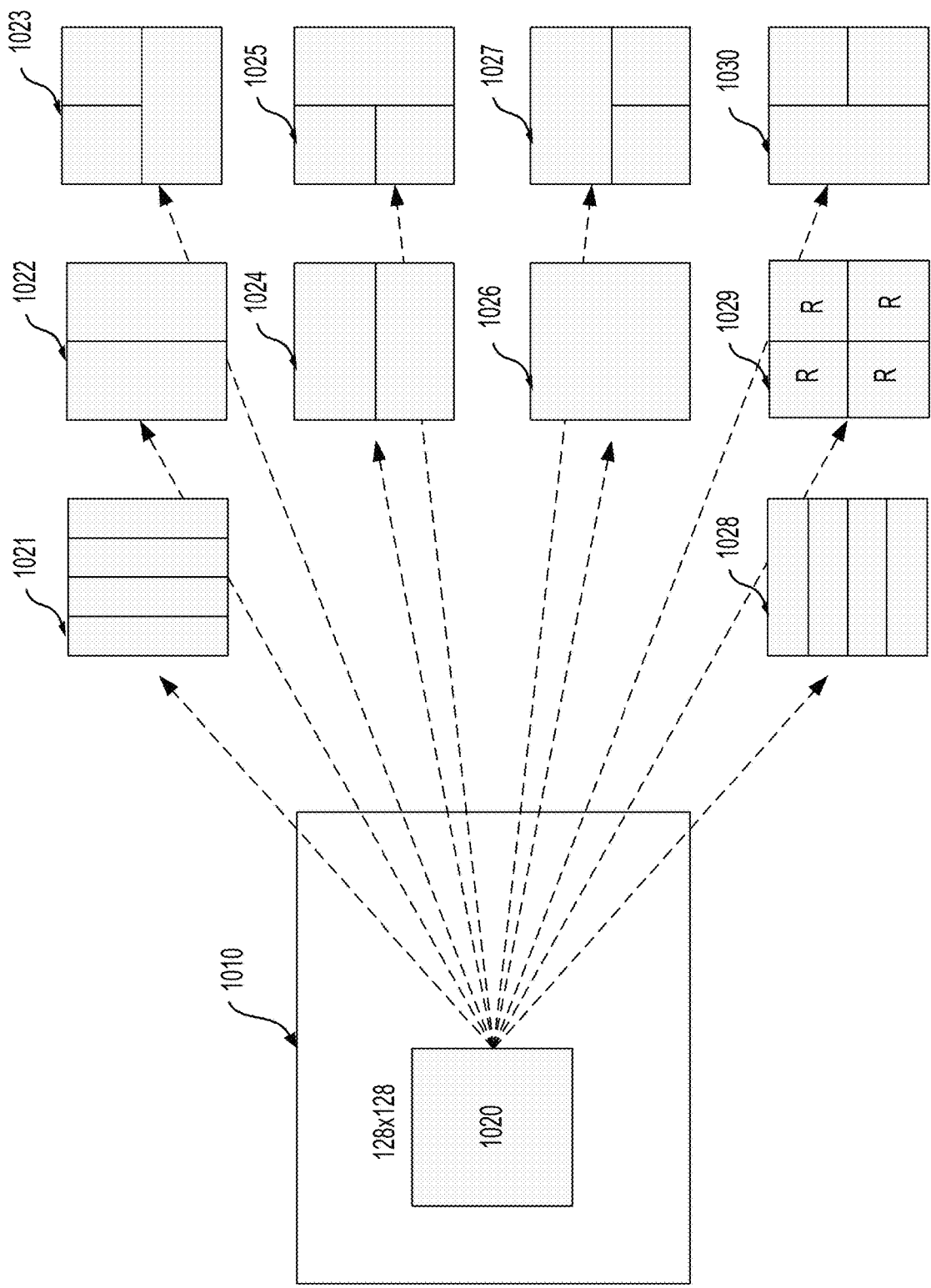
FIG. 10 shows an example of partition techniques used in another video coding format example.

FIG. 10 shows an example of partition techniques used in AV1 designed for video transmissions over the Internet. AV1 was developed as a successor to VP9. For example, a picture (1010) is partitioned into a plurality of blocks (1020) of a size 128×128 (e.g., 128 samples×128 samples). Further, a 10-way partition structure can start from 128×128 down to smaller blocks. In the FIG. 10 example, a 128×128 block can be partitioned into smaller blocks using one of ten ways (1021)-(1030). AV1 not only expands the partition-tree to a 10-way structure, but also increases the largest size (referred to as a superblock in VP9/AV1 parlance) to start from 128×128. A partition designated as R (shown in the way (1029)) refers to as a recursive partition in that the same partition tree can be repeated at a lower scale. The 10-way structure can include 4:1 and 1:4 rectangular partitions, such as shown by (1021) and (1028). In an example, none of the rectangular partitions can be further subdivided. In addition, AV1 adds more flexibility to the use of partitions below an 8×8 level. For example, a 2×2 chroma inter prediction is possible for certain cases.

In some examples, the block partitioning structure is referred to as a coding tree. In an example (e.g., HEVC), the coding tree can have a quad tree structure with each split splitting a larger square block into four smaller square blocks. In some examples, a picture is split into coding tree units (CTUs), and then a CTU is split into smaller blocks using the quad tree structure. According to the quad tree structure, a coding tree unit (CTU) is split into coding units (CUs) to adapt to various local characteristics. A decision on whether to code a picture area using an inter-picture prediction (or an inter prediction) (temporal) or an intra-picture prediction (or an intra prediction) (spatial) can be made at a CU level. Each CU can be further split into one, two, or four prediction units (PUs) according to a PU splitting type.

Inside one PU, a same prediction process is applied and relevant information (e.g., prediction information) is transmitted to a decoder on a PU basis.

After obtaining a residual block by applying a prediction process based on the PU splitting type, a CU can be partitioned into transform units (TUs) according to another quad tree structure. In the example of HEVC, there are multiple partition conceptions including CU, PU, and TU. In some embodiments, a CU or a TU can only have a square shape, while a PU may have a square or a rectangular shape. In some embodiments, one coding block may be further split into four square sub-blocks, and transform is performed on each sub-block, e.g., a TU. Each TU can be further split recursively into smaller TUs using a quad tree structure that is called a residual quad tree (RQT).

At a picture boundary, in some examples (e.g., HEVC), an implicit quad tree split can be employed so that a block keeps a quad tree splitting until the size fits the picture boundary.

In some examples (e.g., VVC), a block partitioning structure can use quad tree plus binary tree (QTBT) block partitioning structure. The QTBT structure can remove the concepts of multiple partition types (the CU, PU and TU concepts), and supports more flexibility for CU partition shapes. In the QTBT block partitioning structure, a CU can have either a square or rectangular shape.

FIG. 11A shows a CTU (1110) that is partitioned by using a QTBT block partitioning structure (1120) shown in FIG. 11B. The CTU (1110) is first partitioned by a quad tree structure. The quad tree leaf nodes are further partitioned by a binary tree structure or a quad tree structure. There can be two splitting types, a symmetric horizontal splitting (e.g., labeled as "0" in the QTBT block partitioning structure (1120)) and a symmetric vertical splitting (e.g., labeled as "1" in the QTBT block partitioning structure (1120)), in the binary tree splitting. The leaf nodes without further splitting are called CUs that can be used for prediction and transform processing without any further partitioning. Accordingly, CU, PU and TU have the same block size in the QTBT block partitioning structure.

In some examples (e.g., JEM), a CU can include coding blocks (CBs) of different color components. For example, one CU contains one luma CB and two chroma CBs in the case of P and B slices of the 4:2:0 chroma format. A CU can include a CB of a single color component. For example, one CU contains only one luma CB or just two chroma CBs in the case of I slices.

The following parameters are defined for the QTBT block partitioning scheme in some embodiments:
CTU size: the root node size of a quad tree, e.g. the same concept as in HEVC.
MinQTSize: the minimum allowed quad tree leaf node size.
MaxBTSize: the maximum allowed binary tree root node size.
MaxBTDepth: the maximum allowed binary tree depth.
MinBTSize: the minimum allowed binary tree leaf node size.

In one example of the QTBT block partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quad tree partitioning is applied to the CTU first to generate quad tree leaf nodes. The quad tree leaf nodes may have a size from 16×16 (i.e., the MinQTSize) to 128×128 (i.e., the CTU size). If the leaf quad tree node is 128×128, the leaf quad tree node will not be further split by the binary tree since the size exceeds the MaxBTSize (i.e., 64×64). Otherwise, the leaf quad tree node could be further partitioned by the binary tree. Therefore, the quad tree leaf node is also the root node for the binary tree and it has the binary tree depth as 0.

When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In an embodiment, a maximum CTU size is 256×256 luma samples.

In FIGS. 11A and 11B, the solid lines indicate quad tree splitting and dotted lines indicate binary tree splitting. In each splitting (i.e., non-leaf) node of the binary tree, one flag is signaled to indicate which splitting type (i.e., horizontal or vertical) is used. For example, 0 indicates a horizontal splitting and 1 indicates a vertical splitting. For the quad tree splitting, there is no need to indicate the splitting type since quad tree splitting can split a block both horizontally and vertically to produce 4 sub-blocks with an equal size.

In some embodiments, the QTBT block partitioning scheme supports the flexibility for the luma and chroma to have separate QTBT block partitioning structures. For example, for P and B slices, the luma and chroma blocks in one CTU share the same QTBT block partitioning structure. However, for I slices, the luma CTB is partitioned into CUs by a QTBT block partitioning structure, and the chroma blocks are partitioned into chroma CUs by another QTBT block partitioning structure. Thus, a CU in an I slice consists of a coding block of the luma component or coding blocks of two chroma components, and a CU in a P or B slice consists of coding blocks of all three color components.

In some examples (e.g., HEVC), inter prediction for small blocks is restricted to reduce memory access of motion compensation. For example, bi-prediction is not supported for 4×8 and 8×4 blocks, and inter prediction is not supported for 4×4 blocks.

Further, in some examples (e.g., VCC), a multi-type tree (MTT) block partitioning structure is used. In some examples, the MTT block partitioning structure is a more flexible tree structure than the QTBT block partitioning structure. In MTT, in addition to quad tree partitioning and binary tree partitioning, a ternary tree (TT) partitioning can be used. TT can include a horizontal center-side triple tree partitioning and a vertical center-side triple tree partitioning.

Figure 12B:
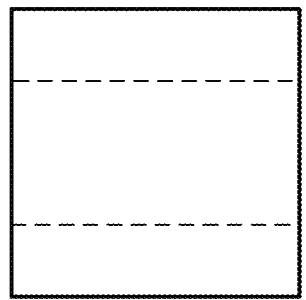
FIGS. 12A and 12B show examples of vertical center-side triple tree partitioning and horizontal center-side triple tree partitioning.
Figure 12A:
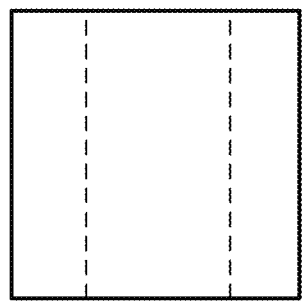

FIG. 12A shows an example of vertical center-side triple tree partitioning and FIG. 12B shows an example of horizontal center-side triple tree partitioning. TT partitioning can complement quad-tree and binary-tree partitioning. For example, triple-tree partitioning can capture objects which locate in a block center, while quad-tree and binary-tree splits crossing block centers. In an example, the width and height of partitions by triple trees are a power of 2 so that no additional transform partition is needed.

The design of block partitioning, such as a two-level tree, is mainly motivated by complexity reduction. The complexity of traversing of a tree can be TD, where T denotes the number of split types, and D is the depth of tree.

In the present disclosure, the terms "resolution" and "spatial resolutions" are used interchangeably.

Figure 13:
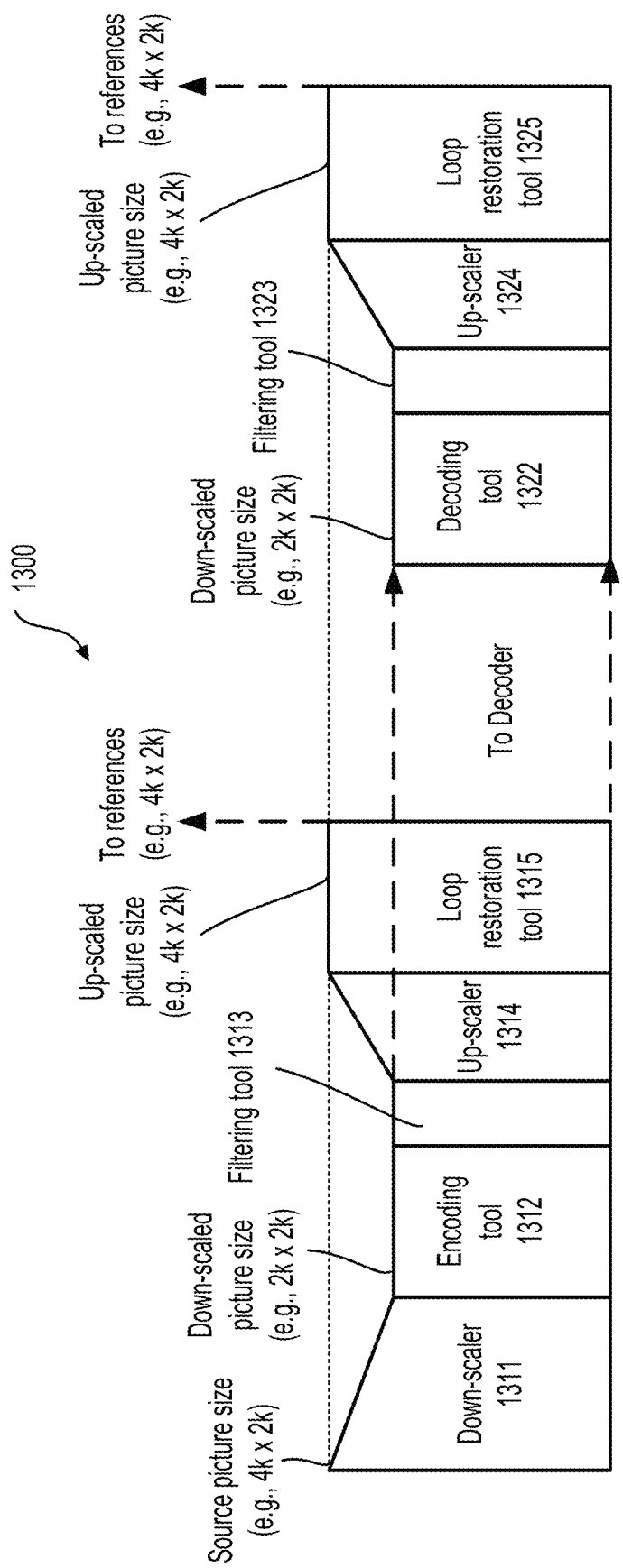
FIG. 13 shows an exemplary loop-filtering pipeline including a frame-level super-resolution coding mode according to an embodiment of the disclosure.

A super resolution coding mode can be used in a video coding format, such as in AV1. FIG. 13 shows an exemplary loop-filtering pipeline (1300) including a frame-level (or picture-level) super-resolution coding mode according to an embodiment of the disclosure.

The frame-level (or picture-level) super-resolution coding mode can include down-sampling (also referred to as down-scaling) a source picture that is to be encoded into a down-sampled picture and encoding the down-sampled picture at a low spatial resolution (also referred to as a reduced spatial resolution or a down-sampled spatial resolution) at an encoder side. The source picture has a full spatial resolution (also referred to as a high spatial resolution or an original spatial resolution) that is higher than the low spatial resolution. The encoded down-sampled picture having the low spatial resolution is sent to a decoder, and can be decoded at the low spatial resolution at a decoder side. Subsequently, the decoded down-sampled picture can be up-sampled (or up-scaled) into a decoded picture having the high spatial resolution.

Referring to FIG. 13, on the encoder side, a source frame (also referred to as a source picture) has a source picture size (e.g., 4 k x 2 k or 4000 samples×2000 samples) corresponding to the high spatial resolution (e.g., 4 k x 2 k). The source frame can be first down-scaled (or down-sampled) by a down-scaler (also referred to as a down-sampler) (1311) in a non-normative way and thus encoded at the low spatial resolution (e.g., 2 k x 2 k). After being down-sampled, the down-sampled picture having a down-scaled picture size, such as 2 k x 2 k or 2000 samples×2000 samples which corresponds to the low spatial resolution. The down-sampled picture is encoded using an encoding tool (1312) that can include intra or inter prediction, transformation, quantization, entropy encoding, and/or the like. The encoded down-sampled picture can also be filtered by a filter tool (1313) including one or more filters, for example, a deblocking filter and a Constrained Directional Enhancement Filter (CDEF). The filtered down-sampled picture can be up-scaled (or up-sampled) by an up-scaler (1314) to generate an up-scaled (or up-sampled) picture having the high spatial resolution (e.g., 4 k x 2 k). The up-scaled picture can be used as a reference picture having the high spatial resolution (e.g., 4 k x 2 k), for example, to predict another picture. The up-scaler (1314) can be a linear up-scaler (also referred to as a linear up-scaling filter) in a normative way. In some examples, a loop restoration tool (1315) is applied to the up-scaled picture at the high spatial resolution to recover the high-frequency details lost during down-sampling and quantization.

When the super resolution coding mode or the frame-based super resolution coding mode is applied, the filtered down-sampled picture having the low spatial resolution can be sent in a video bitstream to a decoder. At the decoder side, a decoding tool (1322) is used to decode the filtered down-sampled picture that is received by the decoder. The decoded down-sampled picture can be further filtered by a filtering tool (1323) including one or more filters, such as a deblocking filter and a CDEF. The deblocking filter and the CDEF can be applied to remove coding artifacts while preserving edges at the low resolution. Then an up-scaler (1324) can be applied, for example, along a horizontal direction only to get a full spatial resolution reconstruction (e.g., an up-scaled reconstructed picture) having the high spatial resolution. The up-scaler (1324) can be a linear up-scaling filter in a normative way. A loop restoration tool (or a loop-restoration filter) (1325) can be optionally applied to the up-scaled reconstructed picture at the high spatial resolution to recover the high-frequency details lost during down-sampling and quantization.

The frame-level super resolution coding mode can be applied to the horizontal direction and/or the vertical direction. In an example, the frame-level super resolution coding mode is applied to the horizontal direction where the spatial resolution of a picture along the horizontal direction is changed and the spatial resolution along the vertical direction remains the same throughout a coding process, and thus is referred to as a horizontal-only frame-level super resolution coding mode.

In some examples (e.g., AV1), the super resolution coding mode is a special mode signaled at a frame level (also referred to as a picture level). Each coded frame can use a horizontal-only super resolution coding mode with a selected resolution within ratio constraints. Information signaled can indicate whether to apply the linear up-sampling after decoding a frame and a scaling-ratio to be used.

When the super resolution coding mode is applied only in one direction (e.g., the horizontal direction or the vertical direction), the scaling-ratio can be refer to an up-sampling ratio or a corresponding down-sampling ratio. An up-sampling ratio can have nine possible values given as d/8. In an example, d is an integer in a range of 8 to 16, and thus d is 8, 9, . . . , or 16. A corresponding down-sampling ratio before encoding can be a ratio of 1 over the up-sampling ratio (e.g., 8/d), and thus can be in a range of 1/2 to 1. Referring to FIG. 13, the super resolution coding mode is applied only in the horizontal direction, the down-sampling ratio is 1/2 and the up-sampling ratio is 2 corresponding to d being 16.

Given an output frame dimension of W×H (corresponding to the high spatial resolution) and the up-sampling ratio d/8, the encoder and the decoder can calculate the low-resolution coded frame dimension as w×H where a reduced (or down-sampled) width w is (8 W+d/2)/d. An input to the linear upscaling process performed by the up-scaler (e.g., (1314) or (1324)) is a reduced frame of the low spatial resolution w×H and an output from the linear upscaling process performed by the up-scaler (e.g., (1314) or (1324)) is a frame with the high spatial resolution W×H as specified in a frame header (also referred to as a picture header). The normative horizontal linear upscaler (e.g., (1314) or (1324)) in AV1 can use a $\frac{1}{16}$-th phase linear 8-tap filter for interpolation of each row.

When the super resolution coding mode is applied in the horizontal direction and the vertical direction, scaling-ratios can include a horizontal scaling-ratio and a vertical scaling-ratio. The horizontal scaling-ratio can refer to a horizontal up-sampling ratio or a corresponding horizontal down-sampling ratio as described above. The vertical scaling-ratio can refer to a vertical up-sampling ratio or a corresponding vertical down-sampling ratio, and the description above can be suitably adapted for the vertical scaling-ratio.

Residual values (also referred to as residue data) in a residual block can be transformed (or forward transformed) into transform coefficients in a coefficient block. Transform coefficients in a coefficient block can be transformed (or inversely transformed) into residual values in a residual block. Transform coding examples, such as in AV1, can be described below.

In order to support extended coding block partitions, multiple transform sizes (ranging from 4-point to 64-point for each dimension) and transform shapes (e.g., a square shape, a rectangular shape with a width/height ratio of 2:1, 1:2, 4:1, or 1:4) can be used, for example, for a primary transform in AV1. A 2D transform process can use hybrid transform kernels (e.g., including different 1D transforms for each dimension of a coded residual block). Primary 1D transforms can include a) 4-point, 8-point, 16-point, 32-point, 64-point DCT-2; b) 4-point, 8-point, 16-point asymmetric DST's (e.g., DST-4, e.g., DST-7) and corresponding flipped versions; c) 4-point, 8-point, 16-point, 32-point identity transforms.

The availability of hybrid transform kernels can be based on a transform block size and a prediction mode. For a chroma component, the transform type selection can be performed in an implicit way. For intra prediction residuals, the transform type can be selected according to an intra prediction mode. For inter prediction residuals, the transform type can be selected according to the transform type selection of a co-located luma block. Therefore, for a chroma component, there is no transform type signaling in a bitstream.

Residual coding can refer to the coding of transform coefficients. In some examples, such as in AV1, for each transform unit (TU), a coefficient coder can start with coding a skip sign, which can be followed by coding a transform kernel type and coding an end-of-block (EOB) position of all non-zero coefficients when the transform coding is not skipped. The skip sign can indicate if the transforming coding is skipped. Then each coefficient value can be mapped to multiple level maps (e.g., three level planes) and a sign map (or a sign plane). The sign plane can cover the signs of coefficients and the three level planes can correspond to different ranges of coefficient magnitudes including a lower-level plane, a middle-level plane, and a higher-level plane. The lower level plane can correspond to a range of 0-2, the middle level plane can correspond to a range of 3-14, and the higher-level plane can cover a range of 15 and above.

After the EOB position is coded, the lower level plane and the middle level plane can be coded together in a reverse scan order. The lower level plane can indicate if the coefficient magnitude is between 0 and 2, and the middle level plane can indicate if the range is between 3 and 14. Then the sign plane and the higher level plane can be coded together in a forward scan order, and the higher level plane can indicate the residual value with a magnitude greater than 14, and the remainder is entropy coded using an Exp-Golomb code. A traditional zig-zag scan order can be used, such as in AV1.

Such separation (e.g., a coefficient value mapped to the three level planes and the sign plane) allows a rich context model to be assigned to the lower level plane, which accounts for the transform directions, such as a bi-directional, a horizontal, and a vertical direction, a transform size, and up to five neighbor coefficients for improved compression efficiency at a modest context model size. The middle level plane can use a context model that is similar to that in the lower level plane with a number of context neighbor coefficients being reduced from 5 to 2. The higher-level plane can be coded by the Exp-Golomb code without using a context model. In the sign plane, the DC sign can be coded using DC signs of neighboring transform units of the TU as context information, other sign bits are coded directly without using a context model.

In some examples (e.g., AV1), the super-resolution coding mode is performed on the frame-level, and thus is applied to all areas in a picture with a fixed scaling ratio. Signal statistics in different areas within a picture can vary widely, and thus applying the down-sampling and/or up-sampling to all areas may not be a good rate-distortion trade-off in some examples.

In some examples (e.g., AV1), a maximum CU size is 128×128 (e.g., 128 samples×128 samples) while a maximum transform size is only 64×64 (e.g., 64 samples×64 samples). In order to benefit from the use of a large CU, a correspondingly large (e.g., 128×128) transform kernel can be used. Alternatively, other methods that can similarly achieve energy-compaction as done by a large transform kernel can be used.

According to aspects of the disclosure, whether to apply the super resolution coding mode can be determined adaptively for a portion of a frame (or a picture) at a sub-picture level (or a sub-frame level). The portion can include a subset of blocks or a single block in the frame. In an embodiment, the portion of the frame is a block, and whether to apply the super resolution coding mode can be adaptively determined for the block. The block can refer to a coding block (CB), a coding unit (CU), a prediction block (PB), a transform block (TB), or the like. The block can correspond to a luma component, a chroma component, or any other component (e.g., one of a RGB signal) of a multi-channel signal. In an example, the block is a luma block or a chroma block. The block can be intra coded or inter coded. When the super resolution coding mode is determined to be applied for the block, the super resolution coding mode can be applied for the block and is referred to as a block-level super resolution coding mode. In the block-level super resolution coding mode, whether to apply the super resolution coding mode to a block in a picture can be determined individually for each block. In some examples, a first subset of blocks in a picture is coded using the super resolution coding mode and a second subset of blocks in the picture is coded without the super resolution coding mode. The first subset of blocks in the picture coded using the super resolution coding mode can have an identical scaling ratio or different scaling ratios. In an example, whether to apply the super resolution coding mode can be adaptively determined for each block in a picture.

In the present disclosure, the term "source block" can refer to a block to be encoded by an encoder and can be an input signal to the encoder. The term "reconstructed block" can refer to a block that is reconstructed by a decoder and can be an output signal from the decoder. The reconstructed block can correspond to the source block, and the reconstructed block and the source block can have the high spatial resolution or the full spatial resolution.

If the super resolution coding mode is determined to be applied for a block (e.g., a source block) having the high spatial resolution, a down-sampling process can be performed on a block level by an encoder. Transforms such as a forward transform and an inverse transform can be performed at the low spatial resolution. An up-sampling can be performed on a block level by a decoder.

Figure 14:
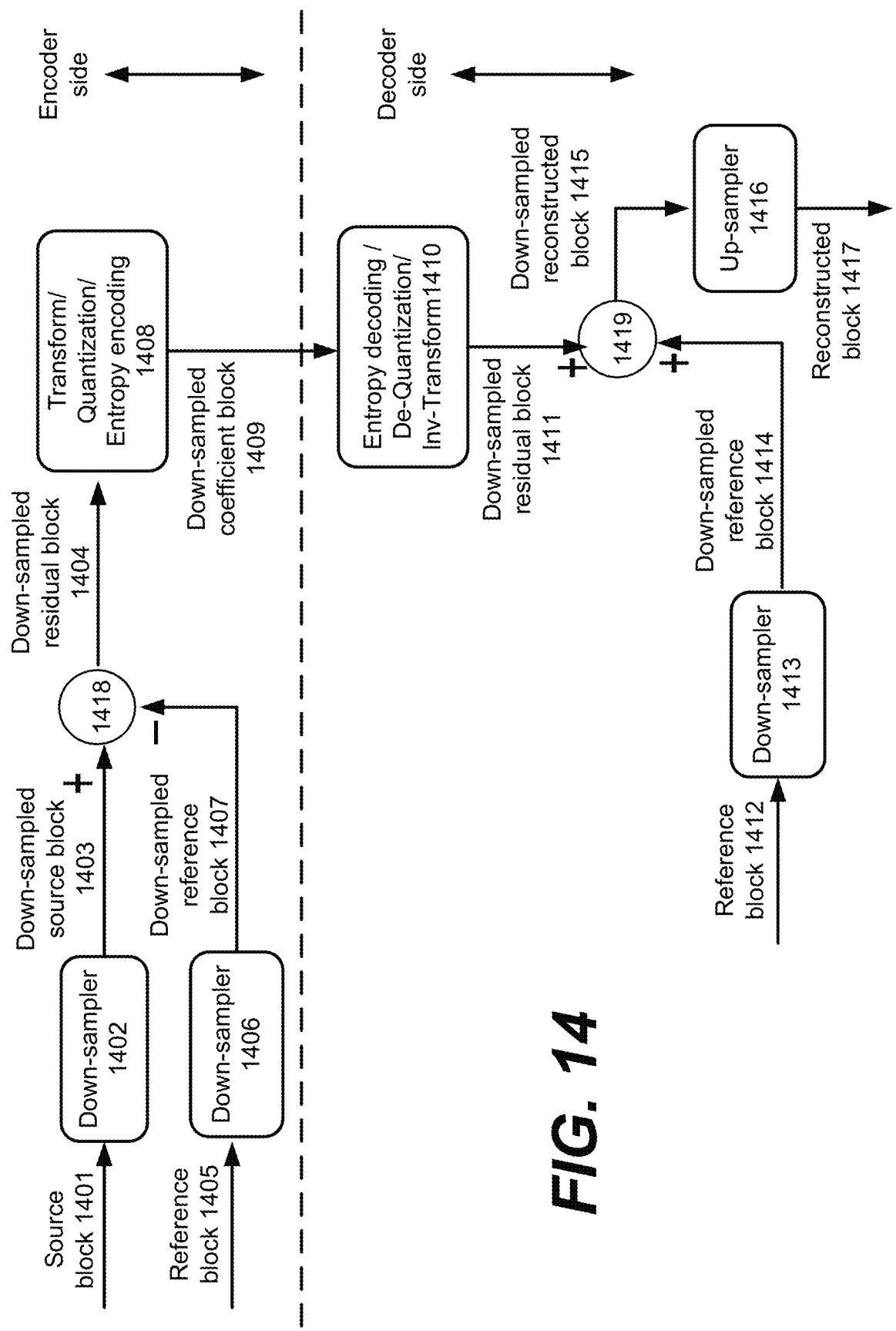
FIG. 14 illustrates a process of coding a block using a block-based super resolution coding mode according to an embodiment of the disclosure.

FIG. 14 illustrates a process of coding a block using the super resolution coding mode according to an embodiment of the disclosure. At an encoder side, a down-sampled version of a source signal and a reference signal (also referred to as a prediction signal) can be used to generate a reduced-resolution residual signal (or a down-sampled residual signal). Then the reduced-resolution residual signal can be transform-coded.

When decoding a picture at a decoder side, the down-sampled prediction signal can be first generated and a decoded reduced-resolution residual signal can be added to generate a down-sampled reconstructed block. Finally, the reduced-resolution reconstructed block can be up-sampled to a reconstructed block having the original resolution.

More specifically, referring to FIG. 14, at the encoder side, a source signal such as a source block (1401) is down-sampled by a down-sampler (1402), and thus a down-sampled signal (e.g., a down-sampled source block (1403)) is generated. A reference signal such as a reference block (1405) is down-sampled by a down-sampler (1406), and thus a down-sampled signal (e.g., a down-sampled reference block (1407)) is generated. Subsequently, a down-sampled residual block (1404) can be generated using a residue calculator (1418). The residual calculator (1418) can be configured to calculate a difference (residue data or residual values) between the down-sampled source block (1403) and the down-sampled reference block (1407). The difference is referred to as the down-sampled residual block (1404). The down-sampled residual block (1404) can be transformed, quantized, and entropy encoded by a tool (1408) to generate a down-sampled coefficient block (1409). The down-sampled coefficient block (1409) can include transform coefficients in a spatial frequency domain. The down-sampled coefficient block (1409) can be sent from an encoder to a decoder.

Referring again to FIG. 14, at a decoder side, the down-sampled coefficient block (1409) is received by a decoder. In some examples, the received down-sampled coefficient block is different from the down-sampled coefficient block (1409) due to transmission loss, distortions, and/or the like. For purposes of brevity, the down-sampled coefficient block (1409) is used as an input signal to a tool (1410) in the decoder. Entropy decoding, de-quantization, and inverse transform (Inv-Transform) can be performed on the down-sampled coefficient block (1409) to generate a down-sampled residual block (1411). A reference block (1412) can be down-sampled by a down-sampler (1413) to generate a down-sampled reference block (1414). Subsequently, an aggregator (1419) can generate a down-sampled reconstructed block (1415) based on the down-sampled residual block (1411) and the down-sampled reference block (1414). In an example, the down-sampled residual block (1411) and the down-sampled reference block (1414) are added to generate the down-sampled reconstructed block (1415). Finally, the down-sampled reconstructed block (1415) can be up-sampled by an up-sampler (1416) to generate a reconstructed block (1417). The down-sampled reconstructed block (1415) and the reconstructed block (1417) can include sample values in the spatial domain, such as luma sample values, chroma sample values, sample values of an RGB signal, or the like.

Referring to FIG. 14, the source block (1401), the corresponding reconstructed block (1417), the reference blocks (1405) and (1412) have the high spatial resolution. The remaining blocks in FIG. 14 have the low spatial resolution, and thus both the encoding process at the encoder side and the decoding process at the decoding side can have high coding efficiency due to a reduction of a number of samples to be processed.

In some examples, the encoding process and the decoding process shown in FIG. 14 are similar or identical to those used without the super resolution coding mode, except for the processes performed by the down-samplers (1402), (1406), and (1413) and the up-sampler (1416). In an example, the down-sampler (1406) is identical to the down-sampler (1413), the reference block (1405) is identical to the reference block (1412), and thus the down-sampled reference block (1407) is identical to the down-sampled reference block (1414). The down-sampler (1402) can be identical to or different from the down-sampler (1406).

In an embodiment, for down-sampling the reference block before reduced-resolution reconstruction, a set of down-sampling filter coefficients used in the down-sampler (1413) can be signaled directly or an index indicating the set of down-sampling filter coefficients can be signaled. The index can indicate the set of down-sampling filter coefficients from a first set of pre-defined coefficients. An identity-filter (e.g., no filtering) can be included in the first set of pre-defined coefficients.

Figure 15A:
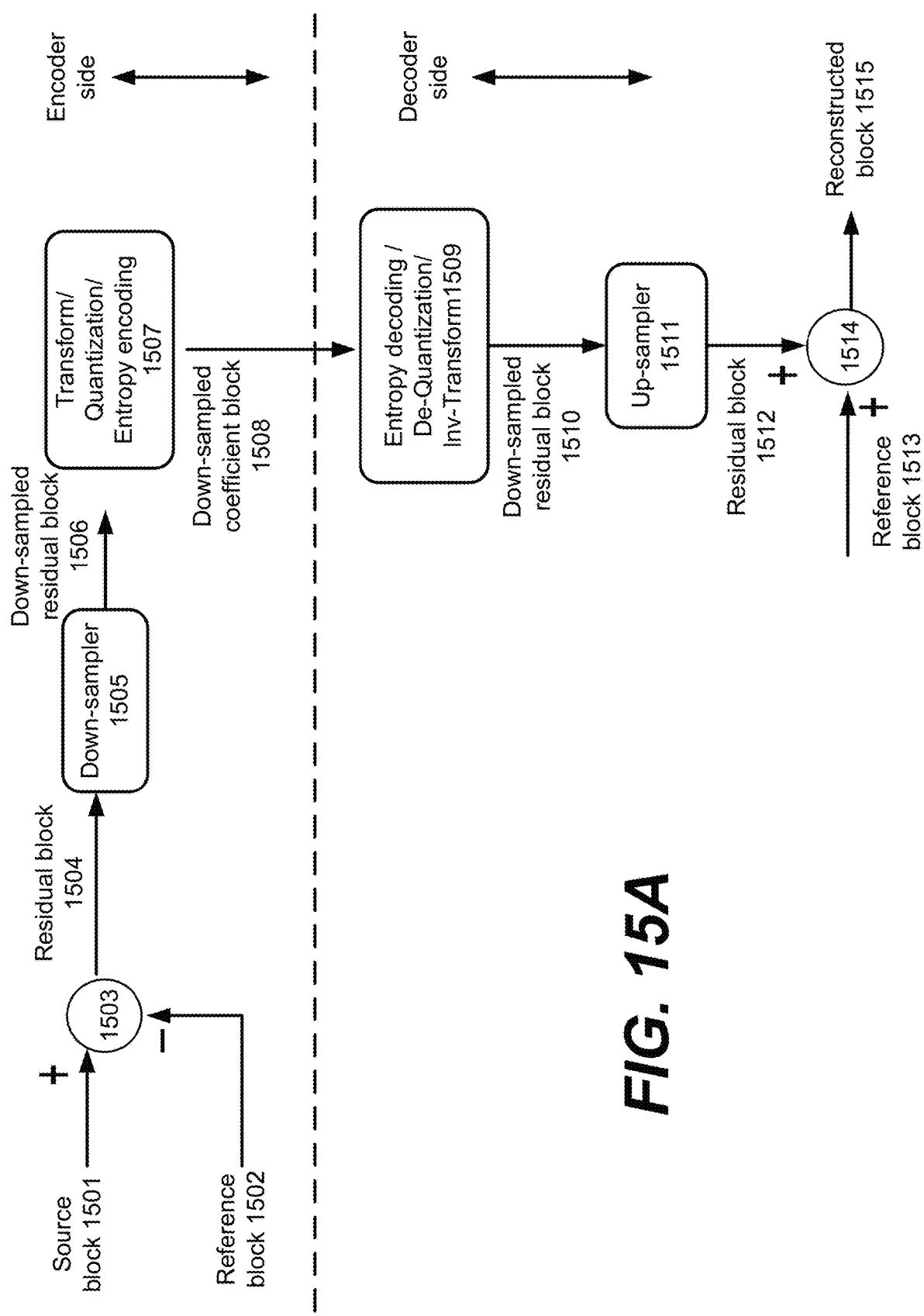
FIG. 15A illustrates a process of coding a block using a block-based super resolution coding mode according to an embodiment of the disclosure.

The block-based super resolution coding mode can be suitably adapted. According to aspects of the disclosure, at an encoder side, a reference signal in the original spatial resolution can be subtracted from a source signal in the original spatial resolution to generate a difference signal (or a residual signal) in the original spatial resolution. The difference signal can be down-sampled to generate a reduced-resolution residual signal. When decoding a block at a decoder side, the reduced resolution residual signal can be up-sampled and added to an original-resolution reference signal to generate a reconstructed block. FIG. 15A illustrates a process of coding a block using an alternative implementation of the block-based super resolution coding mode according to an embodiment of the disclosure.

Referring to FIG. 15A, at the encoder side, a residual block (1504) can be generated using a residue calculator (1503) based on a source signal such as a source block (1501) and a reference signal such as a reference block (1502). The residual calculator (1503) can be configured to calculate a difference (residue data or residual values) between the source block (1501) and the reference block (1502). The residual block (1504) can be down-sampled by a down-sampler (1505) to generate a down-sampled residual block (1506). Subsequently, the down-sampled residual block (1506) can be transformed, quantized, and entropy encoded by a tool (1507) to generate a down-sampled coefficient block (1508). The down-sampled coefficient block (1508) can be sent from an encoder to a decoder.

Referring again to FIG. 15A, at a decoder side, the down-sampled coefficient block (1508) is received by a decoder. In some examples, the received down-sampled coefficient block is different from the down-sampled coefficient block (1508) due to transmission loss, distortions, and/or the like. For purposes of brevity, the down-sampled coefficient block (1508) is used as an input signal to a tool (1509) in the decoder. Entropy decoding, de-quantization, and inverse transform (Inv-Transform) can be performed on the down-sampled coefficient block (1508) to generate a down-sampled residual block (1510). The down-sampled residual block (1510) can be up-sampled by an up-sampler (1511) to generate a residual block (1512). Subsequently, an aggregator (1514) can generate a reconstructed block (1515) based on the residual block (1512) and a reference block (1513). In an example, the residual block (1512) and the reference block (1513) are added to generate the reconstructed block (1515).

Referring to FIG. 15A, the source block (1501), the corresponding reconstructed block (1515), the reference blocks (1502) and (1513), and the residual blocks (1504) and (1512) have the high spatial resolution. The remaining blocks in FIG. 15A have the low spatial resolution, and thus both the encoding process at the encoder side and the decoding process at the decoding side can have high coding efficiency due to a reduction of a number of samples to be processed.

In some examples, the encoding process and the decoding process shown in FIG. 15A are similar or identical to those used without the super resolution coding mode, except for the processes performed by the down-sampler (1505) and the up-sampler (1511).

The block-based super resolution coding mode such as described in FIGS. 14 and 15A can be suitably adapted. In an embodiment, whether to apply the block-level super resolution coding mode is determined for a block such as a TB on which a transform is performed. On the other hand, a prediction process, such as the inter prediction or the intra prediction is performed on another block (e.g., a CB) having a different size from that of the TB. In an example, a CB includes a plurality of transform blocks (TBs). The prediction is performed on the CB. The block-level super resolution coding mode is enabled or disabled individually for each TB in the CB. For example, a CB includes four TBs, the block-level super resolution coding mode is enabled for one of the four TBs, and is disabled for three remaining TBs of the four TBs.

Figure 15B:
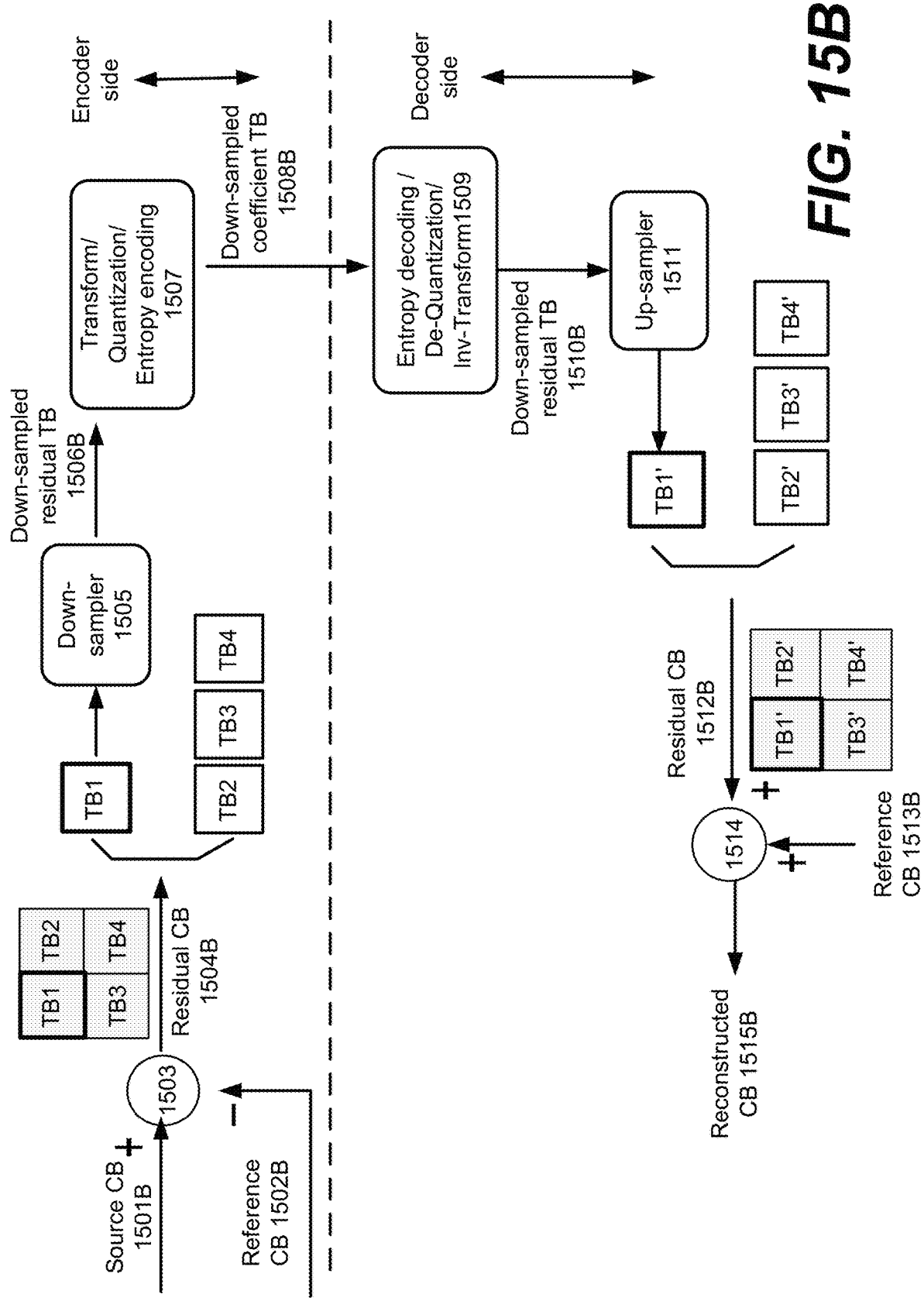
FIG. 15B illustrates a process of coding a block using a block-based super resolution coding mode according to an embodiment of the disclosure.

FIG. 15B illustrates a process of coding a block using the block-based super resolution coding mode according to an embodiment of the disclosure. At the encoder side, a source block (1501B) is a CB (1501B). In an example shown in FIG. 15B, the source CB (1501B) includes four source TBs. A residual CB (1504B) can be generated using the residue calculator (1503) based on a source signal such as the source CB (1501B) and a reference signal such as a reference CB (1502B). The residual calculator (1503) can be configured to calculate a difference (residue data or residual values) between the source CB (1501B) and the reference CB (1502B).

Referring to FIG. 15B, the residual CB (1504B) includes residual TBs (e.g., TB1-TB4) corresponding to the four source TBs, respectively. The block-level super resolution coding mode is enabled or disabled individually for each TB. In an example shown in FIG. 15B, the block-level super resolution coding mode is enabled for TB1 and is disabled for TB2-TB4. Therefore, TB1 can be down-sampled by the down-sampler (1505) to generate a down-sampled residual TB (1506B). Subsequently, the down-sampled residual TB (1506B) can be transformed, quantized, and entropy encoded by the tool (1507) to generate a down-sampled coefficient TB (1508B). The down-sampled coefficient TB (1508B) can be sent from an encoder to a decoder. The remaining TBs in the residual CB (1504B) (e.g., TB2-TB4) can be further encoded, for example, by the tool (1507) to generate coefficient TBs (e.g., coefficient TB2-TB4) and the coefficient TB2-TB4 can be sent from the encoder to the decoder.

Referring again to FIG. 15B, at a decoder side, the down-sampled coefficient TB (1508B) is received by the decoder. In some examples, the received down-sampled coefficient TB is different from the down-sampled coefficient TB (1508B) due to transmission loss, distortions, and/or the like. For purposes of brevity, the down-sampled coefficient TB (1508B) is used as an input signal to the tool (1509) in the decoder. Entropy decoding, de-quantization, and inverse transform (Inv-Transform) can be performed on the down-sampled coefficient TB (1508B) to generate a down-sampled residual TB (1510B). The down-sampled residual TB (1510B) can be up-sampled by the up-sampler (1511) to generate a residual TB1'. Further, the received coefficient TBs (e.g., the coefficient TB2-TB4) corresponding to TB2-TB4 can be decoded, for example, by the tool (1509) to generate residual TBs (e.g., TB2'-TB4') corresponding to TB2-TB4, respectively.

The residual TB1' and the residual TBs (e.g., TB2'-TB4') can be combined to form a residual CB (1512B). Subsequently, the aggregator (1514) can generate a reconstructed CB (1515B) based on the residual CB (1512B) and a reference CB (1513B). In an example, the residual CB (1512B) and the reference CB (1513B) are added to generate the reconstructed CB (1515B).

Referring to FIG. 15B, the source CB (1501B), the corresponding reconstructed CB (1515B), the reference CBs (1502B) and (1513B), and the residual CBs (1504B) and (1512B) have the high spatial resolution. In addition, TB1-TB4, the coefficient TB2-TB4, and TB1'-TB4' have the high spatial resolution. The down-sampled residual TB (1506B), the down-sampled coefficient TB (1508B), and the down-sampled residual TB (1510B) have the low spatial resolution.

In some examples, the encoding process and the decoding process shown in FIG. 15B are similar or identical to those used without the super resolution coding mode, except for the processes performed by the down-sampler (1505) and the up-sampler (1511).

According to aspects of the disclosure, the block-based super resolution coding mode, such as described with reference to FIGS. 14 and 15A can be applied to a source block having the original spatial resolution of M×N (also referred to as an M×N block), and a down-sampled block (e.g., the down-sampled coefficient block (1409) or (1508)) having a size $(M/D_X) \times (N/D_Y)$ can be coded. Parameters $D_X$ and $D_Y$ refer to down-sampling factors along the horizontal and vertical directions, respectively. In an example, the parameters $D_X$ and $D_Y$ correspond to a horizontal up-sampling ratio and a vertical up-sampling ratio, respectively. Example values of M and N can include, but are not limited to, 256, 128, 64, 32, 16, and 8, and the parameter $D_X$ or $D_Y$ can be a positive integer including, but not limited to, 2, 4, 8, or the like.

In an example, such as in AV1 and H.266/VVC, a CU size can be 128×128, and a large transform kernel of the same size (e.g., 128×128) as that of the CU is avoided. Instead, a 64×64 transform is applied to each of the four quadrants of the 128×128 CU. The quadrant refers to one of the four evenly divided areas within the 128×128 CU. According to aspects of the disclosure, the block-level super resolution coding mode can be applied to code a 128×128 CU as follows, such as shown in FIG. 16.

Figure 16:
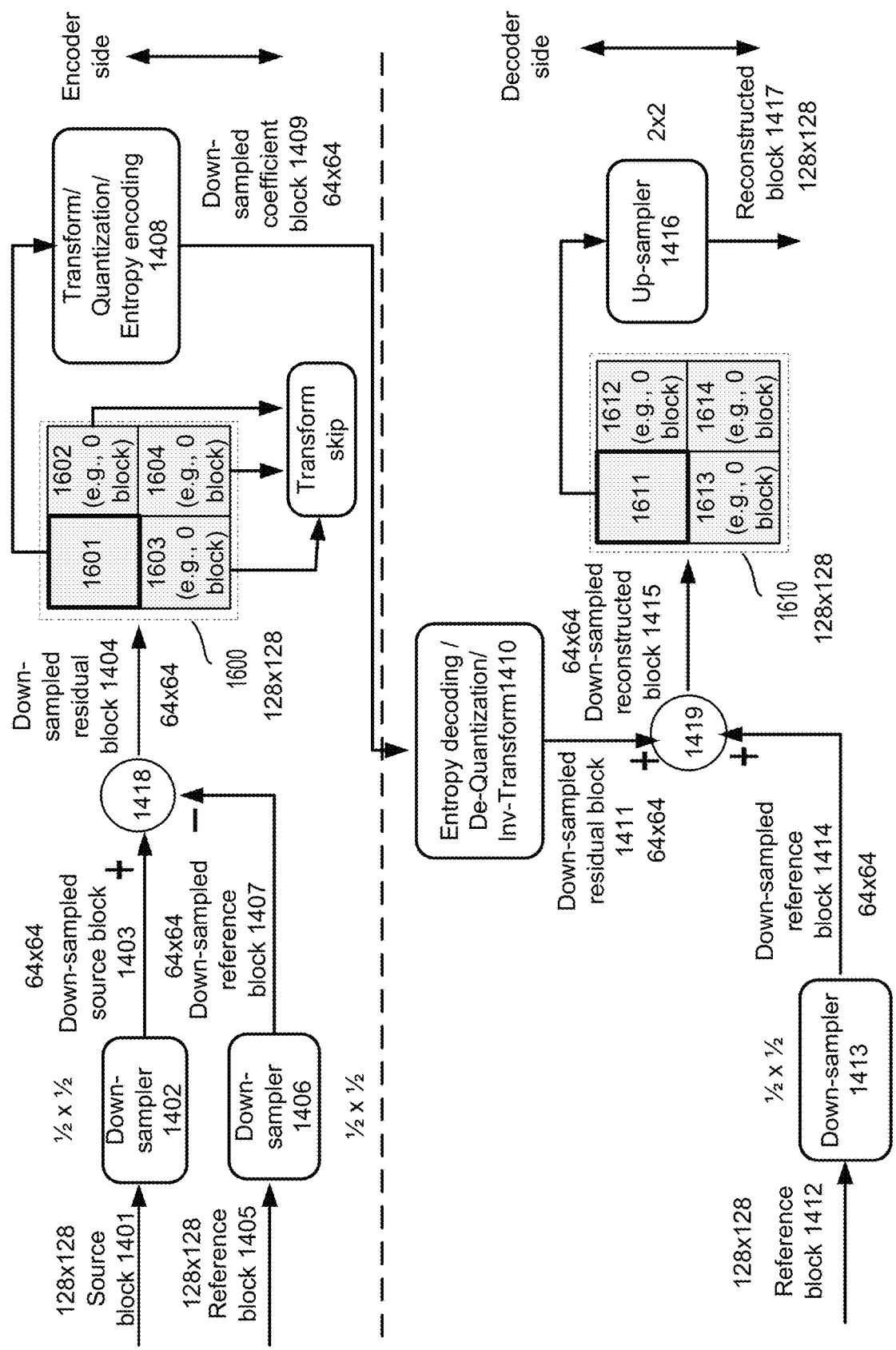
FIG. 16 shows an example of a block-level super resolution coding mode according to an embodiment of the disclosure.

FIG. 16 shows an example of the block-level super resolution coding mode according to an embodiment of the disclosure. Referring to FIG. 16, the source block (1401), the reference blocks (1405) and (1413), and the reconstructed block (1417) correspond to CUs (or CBs) with a size of 128×128. Thus, the original spatial resolution is 128×128. The down-sampling factors $D_X$ and $D_Y$ of the down-samplers (1402) and (1406) are 2. Accordingly, the low spatial resolution is 64×64. Thus, the down-sampled source block (1403), the down-sampled reference block (1407), the down-sampled residual block (1404), the down-sampled coefficient block (1409), the down-sampled residual block (1411), the down-sampled reconstructed block (1415), and the down-sampled reference block (1414) have a size of 64×64. Detailed description of FIG. 16 is similar or identical to that of FIG. 14 except processes associated with blocks (1600) and (1610), and thus differences (associated with blocks (1600) and (1610)) between FIGS. 14 and 16 are described below.

The block (1600) is a residual block (1600) corresponds to a CU with the size 128×128 and has the size 128×128. Specifically, one of four quadrants (1601)-(1604) of the residual block (1600) can be replaced with the down-sampled 64×64 version (e.g., the down-sampled residual block (1404)) and the remaining three quadrants (1602)-(1604) can be zeroed-out. For example, the remaining three quadrants (1602)-(1604) are transformed skipped. Therefore, only one 64×64 transform (as opposed to four 64×64 transforms) is applied to a 128×128 CU while energy compaction is facilitated via the down-sampling process and the up-sampling process in FIG. 16. In some examples (e.g., in AV1), transform sub-splitting can be allowed within a CU, a transform skip can be chosen for the remaining three 64×64 quadrants (1602)-(1604) as the remaining three 64×64 quadrants (1602)-(1604) have no residuals. Referring to FIG. 16, the three 64×64 quadrants (1602)-(1604) are zero-blocks where residual values are zero. The transform skip may not need to be signaled as the transform skip can be inferred when the CU is coded using the block-level super resolution coding mode.

At the decoder side, the block (1610) includes a quadrant (1611) that is the down-sampled reconstructed block (1415) and three quadrants (1612)-(1614). Each of the three quadrants (1612)-(1614) is a zero-block where residual values are zero. Subsequently, the quadrant (1611) is up-sampled to obtain the reconstructed block (1417).

Alternatively, the down-sampled 64×64 version of the 128×128 residual block corresponding to a CU of 128×128 can be encoded and/or decoded. An up-sampled version of a down-sampled reconstructed block can be used to fill the 128×128 reconstructed block corresponding to the CU of 128×128 at the decoder without using the processes including quadrants or transform skip when the CU is coded using the method in FIG. 16.

In some examples, when applying the 64×64 transform on the down-sampled residual block as shown in the tool (1408), the zeroing-out of high-frequency transform coefficients (e.g., as normatively specified in AV1) can be disabled to avoid discarding too much information.

Figure 17:
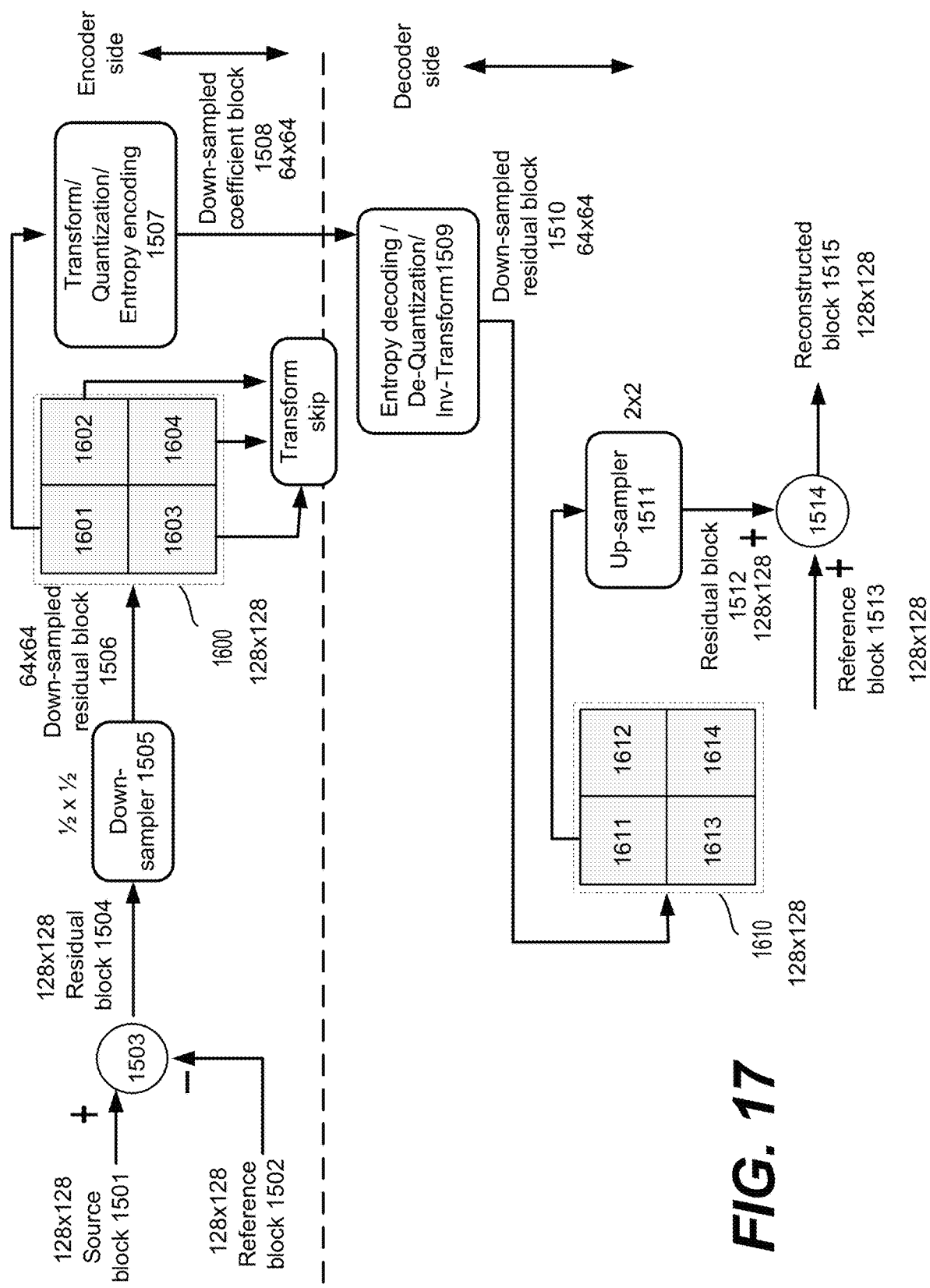
FIG. 17 shows an example of a block-level super resolution coding mode according to an embodiment of the disclosure.

The block-level super resolution coding mode in FIG. 15A can also be adapted similarly as shown in FIG. 17. Detailed descriptions for FIG. 17 are similar to or identical to those in FIG. 15A except processes associated with the blocks (1600) and (1610), and thus differences (associated with the blocks (1600) and (1610)) between FIGS. 15A and 17 are described below. Further, the detailed descriptions for the blocks (1600) and (1610) are similar or identical to those in FIG. 16, and are omitted for purposes of brevity. Specifically, one (e.g., (1601)) of the four quadrants (1601)-(1604) of the residual block (1600) can be replaced with the down-sampled 64×64 version (e.g., the down-sampled residual block (1506)) and the remaining three quadrants (1602)-(1604) can be zeroed-out, similar to identical to that described in FIG. 16.

At the decoder side, the block (1610) is a residual block (1610) including the quadrant (1611) that is the down-sampled residual block (1510) and the three quadrants (1612)-(1614). Each of the three quadrants (1612)-(1614) is a zero-block where residual values are zero. Subsequently, the quadrant (1611) is up-sampled to obtain the residual block (1512).

According to aspects of the disclosure, an up-sampler (e.g., the up-sampler (1416) in FIGS. 14 and 16 for up-sampling the reduced-resolution reconstruction block or the up-sampler (1511) in FIGS. 15A, 15B, and 17 for up-sampling the reduced-resolution residual block) can be an up-sampling filter indicated by a set of up-sampling filter coefficients. The set of up-sampling filter coefficients can be signaled directly or an index indicating the set of up-sampling filter coefficients can be signaled. The index can indicate the set of up-sampling filter coefficients from a set of pre-defined coefficients, for example, including an identity-filter (e.g., no filtering).

According to aspects of the disclosure, whether to apply the block-level super resolution coding mode (such as described with reference to FIGS. 14, 15A, 15B, 16, and 17) can depend on a CU size. The CU size can refer to any size information such as a CU width, a CU height, a CU area (e.g., the CU width x the CU height), and/or the like. A decision regarding which CU size(s) that the block-level super resolution coding is applied to can be signaled. For example, in a high-level syntax (e.g., a level above the CU level, such as a sub-picture level, a picture header, a picture parameter set, a sequence parameter set, or the like), CU size(s) to which the block-level super resolution coding mode is applied can be signaled.

According to aspects of the disclosure, the block-level super resolution coding mode (such as described with reference to FIGS. 14, 15A, 15B, 16, and 17) can be enabled or disabled adaptively at any suitable level for one or more blocks within the level. The level can correspond to a block, a sub-picture area including a plurality of blocks, a picture, or multiple pictures. According to aspects of the disclosure, the block-level super resolution coding mode can be enabled or disabled per CU at a CU level, per superblock at a superblock level, per PB at a PB level, per TB at a TB level, per tile at a tile level, per coded-segment at a segment level, per frame (or picture) at a frame (or picture) level, per sequence at a sequence level, or the like. Whether the block-level super resolution coding mode is enabled or disabled for the one or more blocks within the level can be signaled or inferred.

In an example, the level is the tile level, and a tile includes multiple CBs. The one or more blocks are the multiple CBs. Whether the block-level super resolution coding mode is enabled for the multiple CBs can be signaled for the tile. If the block-level super resolution coding mode is determined to be enabled for the multiple CBs, each CB in the tile can be encoded and/or decoded with the super resolution coding mode such as shown in FIGS. 14, 15A, 16, and 17.

In an example, a CB includes a plurality of TBs, and the level is the TB level. The one or more blocks can be the TB. Whether the block-level super resolution coding mode is enabled for the TB can be signaled at the TB level. Thus, the block-level super resolution coding mode is enabled or disabled for each TB in the CB individually, such as shown in FIG. 15B.

According to aspects of the disclosure, if the block-level super resolution coding mode (such as described with reference to FIGS. 14, 15A, 16, and 17) is enabled, (i) type(s) of down-sampler(s) and/or up-sampler(s) and/or (ii) a scaling-ratio used in the block-level super resolution coding mode can be determined based on feature(s) of a portion of a picture, such as a CU, a tile, or a coded-segment. The down-sampler(s) and up-sampler(s) can also be referred to as down-sampling filter(s) and up-sampling filter(s), respectively. The feature(s) can be indicated by feature indicator (s), such as a directionality or signal statistics (e.g., a signal variance), of a CU, a tile, or a coded-segment. The feature indicator(s) can be signaled or derived at the encoder and the decoder. In an example, different down-sampling filter(s), up-sampling filter(s), and/or scaling ratio(s) can be used based upon the feature-indicator(s).

In an example, for each CU of a size N×N (e.g., N samples x N samples where N is a positive integer) with a top-left sample position r, horizontal and vertical 1-D Laplacian activities (denoted as $H_{N \times N}$ and $V_{N \times N}$, respectively) can be computed using prediction samples at the encoder and the decoder using only (N−2)×(N−2) inner samples as follows:

$$H_{N \times N} = \Sigma_{j=1}^{N-2} \Sigma_{i=1}^{N-2} hor(r,i,j) \qquad \text{Eq. 1}$$

$$V_{N \times N} = \Sigma_{j=1}^{N-2} \Sigma_{i=1}^{N-2} ver(r,i,j) \qquad \text{Eq. 2}$$

where hor(r,i,j) and ver(r,i,j) are defined as:

$$hor(r,i,j) = |2I[r+(i,j)] + I[r+(i-1,j)] - I[r+(i+1,j)]| \qquad \text{Eq. 3}$$

$$ver(r,i,j) = |2I[r+(i,j)] + I[r+(i,j-1)] - I[r+(i,j+1)]| \qquad \text{Eq. 4}$$

where I(x,y) represents a pixel intensity value (also referred to as a sample value) at a sample position (x,y).

A 2D Laplacian activity can be computed by adding $V_{N \times N}$ and $H_{N \times N}$ to obtain a sum value and quantizing the sum value into a plurality of activity level classes (e.g., 0, 1, 2, 3, 4, and 5). The plurality of activity level classes indicating the 2D Laplacian activity can be used as a feature-indicator by the encoder and/or the decoder.

In an example, a direction (referred to as a directionality indicator) associated with the super resolution coding mode can be determined as follows. If $H_{N \times N} > 2V_{N \times N}$, the directionality indicator indicates a first directionality (e.g., the horizontal direction), and thus down-/up-sampling filters and/or sampling ratios can be selected based on the first directionality (e.g., $H_{N \times N}$ being larger than $2V_{N \times N}$). If $V_{N \times N} > 2H_{N \times N}$, the directionality indicator indicates a second directionality (e.g., the vertical direction), and thus the down-/up-sampling filters and/or the sampling ratios can be selected based on the second directionality (e.g., $V_{N \times N}$ being larger than $2H_{N \times N}$). Otherwise, for example, if $H_{N \times N}$ is not larger than $2V_{N \times N}$ and $V_{N \times N}$ is not larger than $2H_{N \times N}$, the directionality indicator indicates a third directionality (e.g., there is no directionality), and thus the down-/up-sampling filters and/or the sampling ratios can be selected accordingly. In an example, if the directionality indicator indicates the third directionality, the up-sampling/down-sampling is performed in both the horizontal direction and the vertical direction. The directionality as described above can also be used as a feature indicator by the encoder and/or the decoder.

Figure 18:
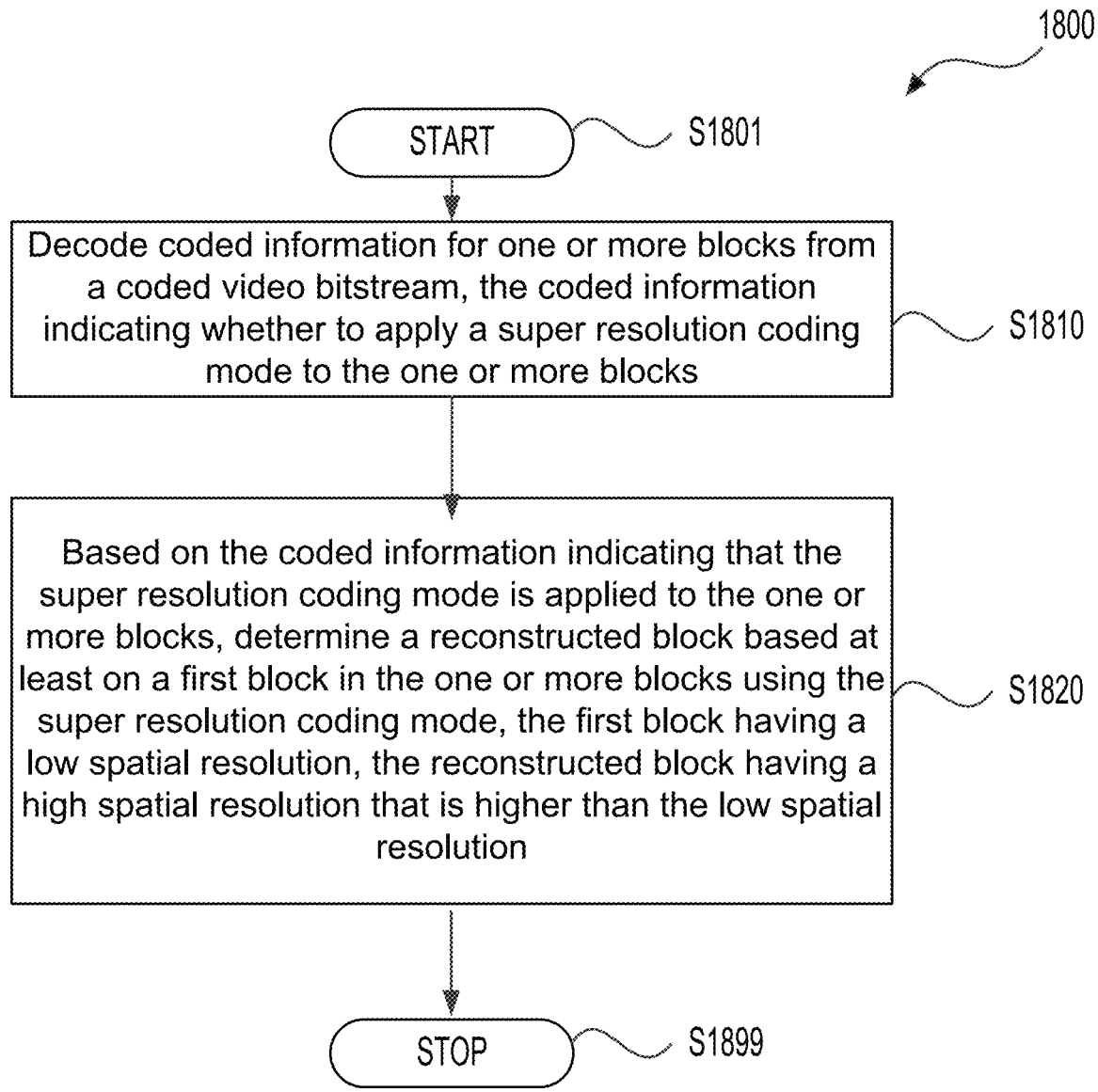
FIG. 18 shows a flow chart outlining a process (1800) according to an embodiment of the disclosure.

FIG. 18 shows a flow chart outlining a process (1800) according to an embodiment of the disclosure. The process (1800) can be used in the reconstruction of a block, such as a CB, a CU, a PB, a TB, a TU, a luma block (e.g., a luma CB or a luma TB), a chroma block (e.g., a chroma CB or a chroma TB), or the like. In various embodiments, the process (1800) are executed by processing circuitry, such as the processing circuitry in the terminal devices (310), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1800) is implemented in software instructions, thus when the processing circuitry executes the software instructions, the processing circuitry performs the process (1800). The process starts at (S1801) and proceeds to (S1810).

At (S1810), coded information for one or more blocks can be decoded from a coded video bitstream. The coded information can indicate whether to apply the super resolution coding mode (or the block-based super resolution coding mode) to the one or more blocks. In some examples, the super resolution coding mode is applied in response to the one or more blocks having been down sampled from a high spatial resolution to a low spatial resolution by an encoder. In an example, a flag is signaled in the coded information to indicate whether to apply the super resolution coding mode to the one or more blocks. Alternatively, whether to apply the super resolution coding mode to the one or more blocks can be inferred from the coded information.

In an embodiment, the one or more blocks are coding blocks (CBs), coding units (CUs), prediction blocks (PBs), or transform blocks (TBs). The coded information can indicate whether to apply the super resolution coding mode to each of the one or more blocks.

In an embodiment, the coded information can indicate whether to apply the super resolution coding mode to a CU, a CB, a superblock, a PB, a TB, a tile, a coded-segment, a frame, or a sequence that includes the one or more blocks.

At (S1820), based on the coded information indicating that the super resolution coding mode is applied to the one or more blocks, a reconstructed block can be generated using the super resolution coding mode based on a first block in the one or more blocks. In some examples, the reconstructed block can be generated using the super resolution coding mode by upsampling information of the first block in the one or more blocks. The information of the first block can include a down-sampled residual block associated with the first block or a down-sampled reconstructed block associated with the first block. The first block can have the low spatial resolution, and the reconstructed block can have the high spatial resolution higher than the low spatial resolution. The one or more blocks can include transform coefficients in a spatial frequency domain (also referred to as a frequency domain), and the reconstructed block includes sample values in a spatial domain, such as luma and/or chroma sample values. In an example, a respective reconstructed block is generated based on each of the one or more blocks using the block-level super resolution coding mode.

In an embodiment, the first block is inversely transformed into a down-sampled residual block having the low spatial resolution, for example, by the tool (1410) in FIGS. 14 and 16 or the tool (1509) in FIGS. 15A, 15B, and 17. Referring to FIGS. 14, 15A, 15B, 16, and 17 the first block can refer to the down-sampled coefficient block (1409), (1508), or (1508B), and the down-sampled residual block can refer to the down-sampled residual block (1411), (1510), or (1510B).

After the first block is inversely transformed into the down-sampled residual block, different methods can be used to obtain the reconstructed block.

In an example, a down-sampled reference block can be obtained by down-sampling a reference block for the first block. The reference block and the down-sampled reference block can have the high spatial resolution and the low spatial resolution, respectively. Referring to FIG. 14 or 16, the down-sampled reference block (1414) can be obtained by down-sampling the reference block (1412) for the first block. A down-sampled reconstructed block (e.g., (1415)) can be generated based on the down-sampled residual block (e.g., (1411)) and the down-sampled reference block (e.g., (1414)) where the down-sampled reconstructed block has the low spatial resolution. Further, the reconstructed block (e.g., (1417)) can be generated by up-sampling the down-sampled reconstructed block (e.g., (1415)).

In another example, such as shown in FIG. 15A or 17, a residual block (e.g., (1512)) is obtained by up-sampling the down-sampled residual block (e.g., (1510)) where the residual block has the high spatial resolution. Subsequently, the reconstructed block (e.g., (1515)) can be generated based on the obtained residual block (e.g., (1512)) and a reference block (e.g., (1513)) for the first block. The reference block has the high spatial resolution.

The process (1800) proceeds to (S1899), and terminates.

The process (1800) can be suitably adapted. Step(s) in the process (1800) can be modified and/or omitted. Additional step(s) can be added. Any suitable order of implementation can be used. In an example, the one or more blocks are a subset of blocks in a current picture to be reconstructed, and the super resolution coding mode is not applied to a block in the current picture that is different from the one or more blocks.

In an example, a tile in the current picture includes a plurality of CBs. The one or more blocks are the plurality of CBs. At (S1810), the coded information indicates at a tile level that the super resolution coding mode (the block-level the super resolution coding mode) is applied to the tile. Thus, the coded information indicates at the tile level that the super resolution coding mode is applied to the plurality of CBs in the tile. At (S1820), using the super resolution coding mode, a reconstructed block (e.g., a reconstructed CB) is generated based on a first block in the plurality of CBs, such as that described with reference to FIGS. 14, 15A, 16, and 17. The first block is a CB in the plurality of CBs and has the low spatial resolution. The reconstructed block has the high spatial resolution. Step (S1820) can be applied to each of the plurality of CBs in the tile to reconstruct a respective reconstructed block.

Figure 19:
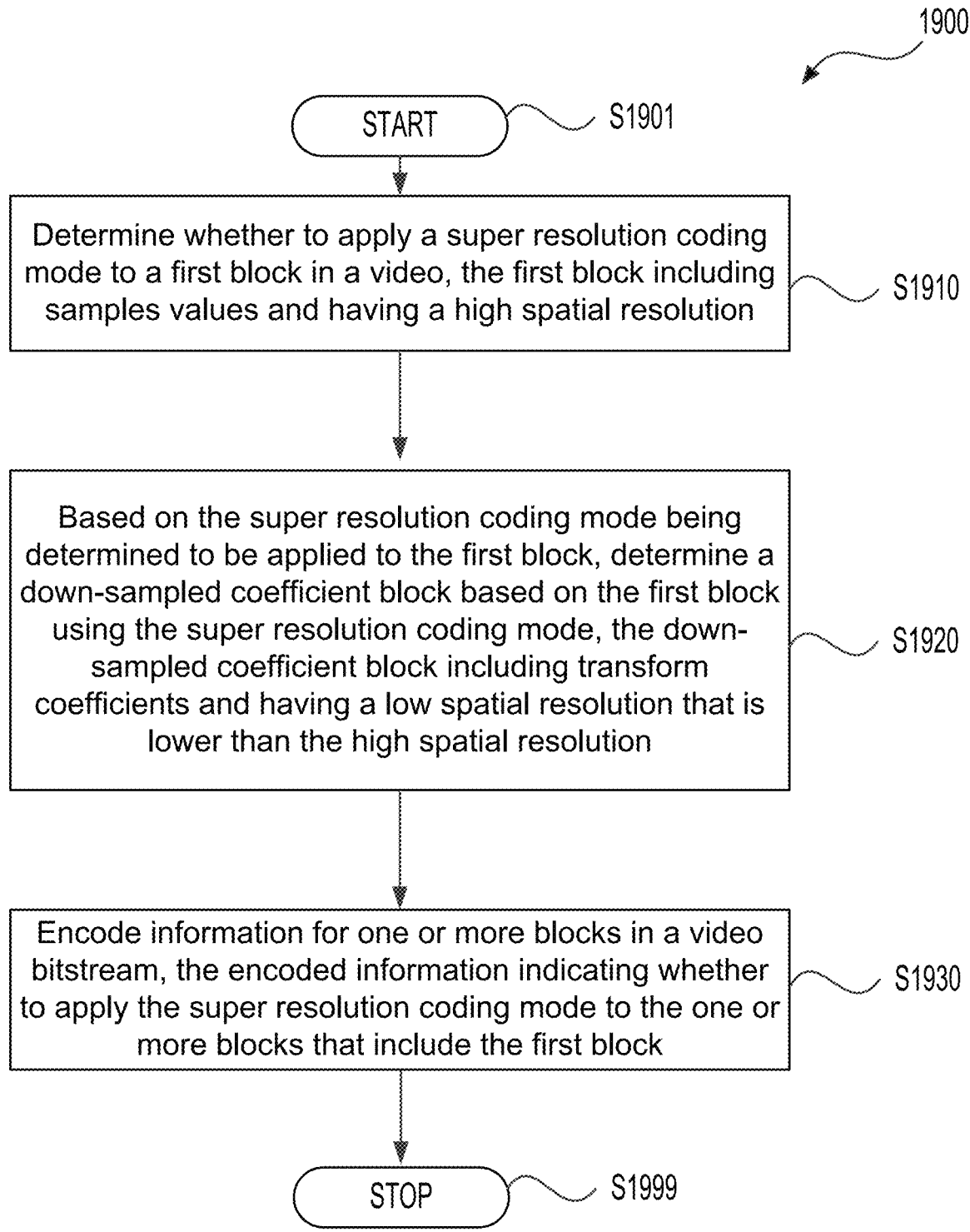
FIG. 19 shows a flow chart outlining a process (1900) according to an embodiment of the disclosure.

FIG. 19 shows a flow chart outlining a process (1900) according to an embodiment of the disclosure. The process (1900) can be used in encoding a block, such as a CB, a CU, a PB, a TB, a TU, a luma block (e.g., a luma CB or a luma TB), a chroma block (e.g., a chroma CB or a chroma TB), or the like. In various embodiments, the process (1900) are executed by processing circuitry, such as the processing circuitry in the terminal devices (310), (320), (330) and (340), the processing circuitry that performs functions of the video encoder (403), the processing circuitry that performs functions of the video encoder (603), and the like. In some embodiments, the process (1900) is implemented in software instructions, thus when the processing circuitry executes the software instructions, the processing circuitry performs the process (1900). The process starts at (S1901) and proceeds to (S1910).

At (S1910), whether to apply the super resolution coding mode to a first block in a video can be determined. The first block can include sample values in a spatial domain, such as luma and/or chroma sample values, and having the high spatial resolution.

In an embodiment, the first block is a CB, a CU, a PB, or a TB.

At (S1920), based on the super resolution coding mode being determined to be applied to the first block, a down-sampled coefficient block can be generated based on the first block using the super resolution coding mode. The down-sampled coefficient block can include transform coefficients and have the low spatial resolution that is lower than the high spatial resolution.

In an embodiment, a down-sampled residual block can be generated based on the first block and a reference block for the first block that has the high spatial resolution. The down-sampled residual block can include residual values and have the low spatial resolution. The down-sampled residual block can be transformed to obtain the down-sampled coefficient block.

Different methods can be used to generate the down-sampled residual block. In an example, such as shown in FIGS. 14 and 16, the first block can be down-sampled to obtain a down-sampled block having the low spatial resolution. The reference block can be down-sampled to obtain a down-sampled reference block having the low spatial resolution. Subsequently, the down-sampled residual block can be generated based on the down-sampled block and the down-sampled reference block.

In another example, a residual block can be generated based on the first block and the reference block. The residual block can have the high spatial resolution. The residual block can be down-sampled to obtain the down-sampled residual block.

At (S1930), information for the first block can be encoded in a video bitstream. The encoded information can indicate whether to apply the super resolution coding mode to the first block. Based on the super resolution coding mode being determined to be applied to the first block, the encoded information can indicate that the super resolution coding mode was applied to the first block. In an example, a flag is signaled in the encoded information to indicate whether to apply the super resolution coding mode to the first block. Alternatively, whether to apply the super resolution coding mode to the first block can be inferred from the encoded information.

In an embodiment, the encoded information indicates whether to apply the super resolution coding mode to a CU, a CB, a superblock, a PB, a TB, a tile, a coded-segment, a frame, or a sequence that includes the first block. Based on the super resolution coding mode being determined to be applied to the first block, the encoded information can indicate that the super resolution coding mode was applied to the CU, the CB, the superblock, the PB, the TB, the tile, the coded-segment, the frame, or the sequence that includes the first block.

The process (1900) proceeds to (S1999), and terminates.

The process (1900) can be suitably adapted. Step(s) in the process (1900) can be modified and/or omitted. Additional step(s) can be added. Any suitable order of implementation can be used. In an example, the super resolution coding mode is determined not to be applied to the first block. Accordingly, at (S1920), a coefficient block having the high spatial resolution is generated based on the first block without the super resolution coding mode. At (S1930), the encoded information indicates that the super resolution coding mode was not applied to the first block.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block.

The techniques described above, can be implemented as computer software using computer-readable instructions and physically stored in one or more computer-readable media. For example, FIG. 20 shows a computer system (2000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 20:
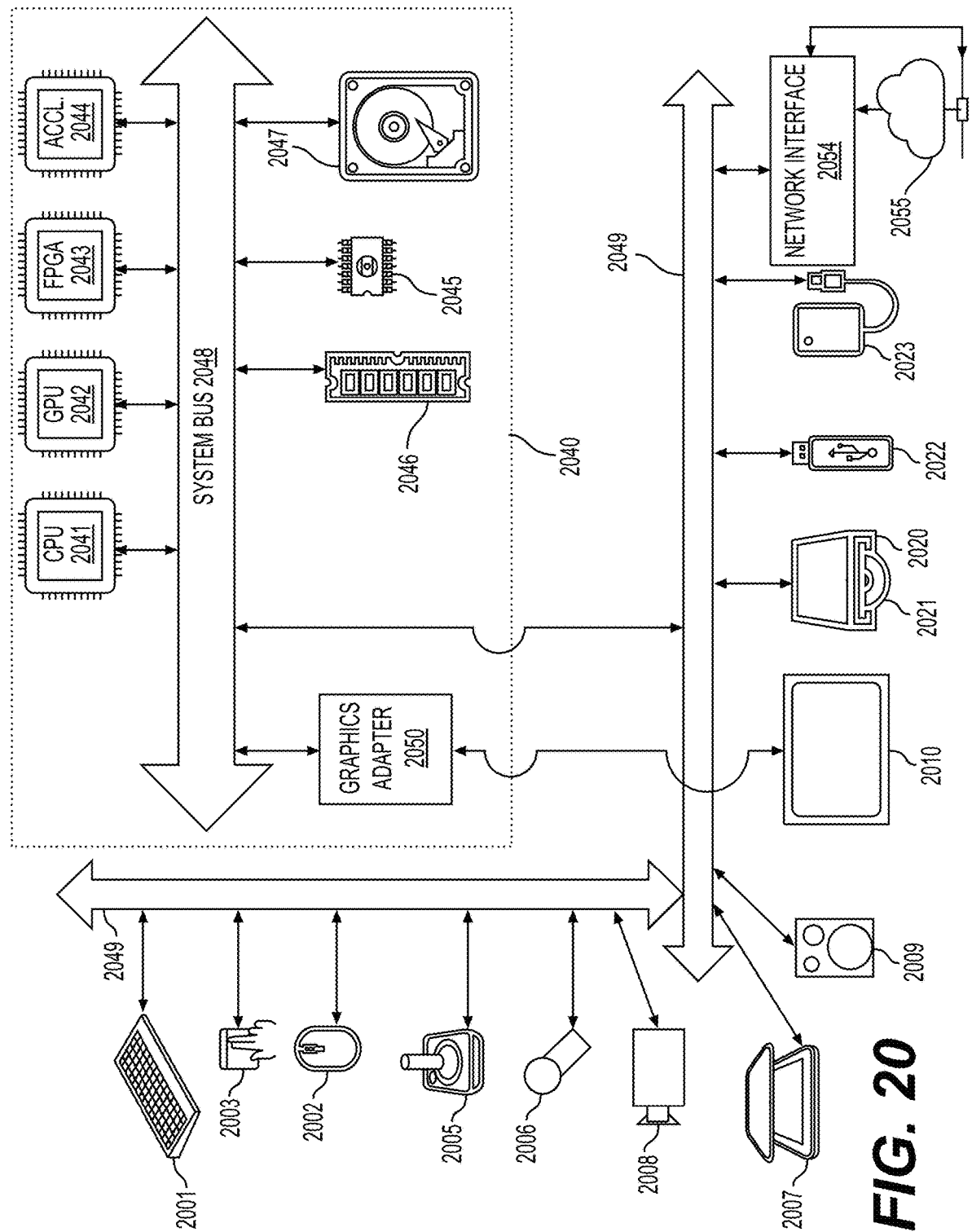
FIG. 20 is a schematic illustration of a computer system in accordance with an embodiment.

The components shown in FIG. 20 for computer system (2000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2000).

Computer system (2000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2001), mouse (2002), trackpad (2003), touch screen (2010), data-glove (not shown), joystick (2005), microphone (2006), scanner (2007), camera (2008).

Computer system (2000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2010), data-glove (not shown), or joystick (2005), but there can also be tactile feedback devices that do not serve as input devices), audio output devices (such as: speakers (2009), headphones (not depicted)), visual output devices (such as screens (2010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2000) can also include human accessible storage devices and their associated media such as optical media including CD/DVD ROM/RW (2020) with CD/DVD or the like media (2021), thumb-drive (2022), removable hard drive or solid state drive (2023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2000) can also include an interface (2054) to one or more communication networks (2055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general purpose data ports or peripheral buses (2049) (such as, for example USB ports of the computer system (2000)); others are commonly integrated into the core of the computer system (2000) by attachment to a system bus as described below (for example Ethernet interface into a PC computer system or cellular network interface into a smart-phone computer system). Using any of these networks, computer system (2000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2040) of the computer system (2000).

The core (2040) can include one or more Central Processing Units (CPU) (2041), Graphics Processing Units (GPU) (2042), specialized programmable processing units in the form of Field Programmable Gate Areas (FPGA) (2043), hardware accelerators for certain tasks (2044), graphics adapters (2050), and so forth. These devices, along with Read-only memory (ROM) (2045), Random-access memory (2046), internal mass storage such as internal non-user accessible hard drives, SSDs, and the like (2047), may be connected through a system bus (2048). In some computer systems, the system bus (2048) can be accessible in the form of one or more physical plugs to enable extensions by additional CPUs, GPU, and the like. The peripheral devices can be attached either directly to the core's system bus (2048), or through a peripheral bus (2049). In an example, the screen (2010) can be connected to the graphics adapter (2050). Architectures for a peripheral bus include PCI, USB, and the like.

CPUs (2041), GPUs (2042), FPGAs (2043), and accelerators (2044) can execute certain instructions that, in combination, can make up the aforementioned computer code. That computer code can be stored in ROM (2045) or RAM (2046). Transitional data can also be stored in RAM (2046), whereas permanent data can be stored for example, in the internal mass storage (2047). Fast storage and retrieve to any of the memory devices can be enabled through the use of cache memory, that can be closely associated with one or more CPU (2041), GPU (2042), mass storage (2047), ROM (2045), RAM (2046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2000), and specifically the core (2040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2040) that are of non-transitory nature, such as core-internal mass storage (2047) or ROM (2045). The software implementing various embodiments of the present disclosure can be stored in such devices and executed by core (2040). A computer-readable medium can include one or more memory devices or chips, according to particular needs. The software can cause the core (2040) and specifically the processors therein (including CPU, GPU, FPGA, and the like) to execute particular processes or particular parts of particular processes described herein, including defining data structures stored in RAM (2046) and modifying such data structures according to the processes defined by the software. In addition or as an alternative, the computer system can provide functionality as a result of logic hardwired or otherwise embodied in a circuit (for example: accelerator (2044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
decoding coded information from a coded video bitstream, the coded information indicating whether to apply a block-level super resolution coding mode to a first part of a coding unit (CU) in a current picture, wherein the block-level super resolution coding mode is applied when the first part of the CU has been down sampled from a high spatial resolution to a low spatial resolution by an encoder; and
based on the coded information indicating that the block-level super resolution coding mode is applied to the first part of the CU,
inversely transforming the first part of the CU including transform coefficients into a down-sampled residual block having the low spatial resolution, and
generating, using the block-level super resolution coding mode, a reconstructed block having the high spatial resolution that is higher than the low spatial resolution by
determining at least one of a vertical scaling ratio or a horizontal scaling ratio corresponding to at least one of an activity level or a directionality of the first part of the CU,
up-sampling the down-sampled residual block to generate a residual block having the high spatial resolution based on the at least one of the determined vertical scaling ratio or horizontal scaling ratio, and
adding the residual block having the high spatial resolution to a reference block for the first part of the CU,
wherein the block-level super resolution coding mode is not applied to a second part of the CU in the current picture that is different from the first part of the CU.

2. The method of claim 1, wherein
the coded information indicates whether to apply the block-level super resolution coding mode to each of the first part of the CU and the second part of the CU.

3. The method of claim 1, wherein the coded information indicates whether to apply the block-level super resolution coding mode to the coding unit (CU), a coding block (CB), a superblock, a prediction block (PB), a transform block (TB), a tile, a coded-segment, a frame, or a sequence that includes the first block.

4. The method of claim 1, wherein the adding comprises:
adding corresponding sample values of the residual block having the high spatial resolution and the reference block, the reference block having the high spatial resolution.

5. The method of claim 1, further comprising:
performing a determination, for each CU in the current picture, whether to apply the block-level super resolution coding mode to the respective CU.

6. An apparatus for video encoding, comprising:
processing circuitry configured to
determine whether to apply a block-level super resolution coding mode to a first part of a coding unit (CU) in a current picture in a video, the first part of the CU including sample values in a spatial domain and having a high spatial resolution; and
based on the block-level super resolution coding mode being determined to be applied to the first part of the CU,
generate a down-sampled coefficient block having a low spatial resolution that is lower than the high spatial resolution based on the first part of the CU using the block-level super resolution coding mode by
determining at least one of a vertical scaling ratio or a horizontal scaling ratio corresponding to at least one of an activity level or a directionality of the first part of the CU, obtaining a residual block by subtracting a reference block from the first part of the CU,
generating a down-sampled residual block by down-sampling the residual block based on the at least one of the determined vertical scaling ration or horizontal scaling ratio, and
transforming the down-sampled residual block to obtain the down-sampled coefficient block; and
encode information for the first part of the CU in a video bitstream, the encoded information indicating that the block-level super resolution coding mode was applied to the first part of the CU, wherein
the block-level super resolution coding mode is not applied to a second part of the CU in the current picture that is different from the first part of the CU.

7. The apparatus of claim 6, wherein the encoded information indicates whether to apply the block-level super resolution coding mode to each of the first part of the CU and the second part of the CU.

8. The apparatus of claim 6, wherein the encoded information indicates that the block-level super resolution coding mode was applied to the coding unit (CU), a coding block (CB), a superblock, a prediction block (PB), a transform block (TB), a tile, a coded-segment, a frame, or a sequence that includes the first block.

9. The apparatus of claim 6, wherein the obtaining comprises:
generating the residual block by subtracting sample values of the reference block from corresponding samples values of the first block, the residual block having the high spatial resolution.

10. A method of processing visual media data, the method comprising:
processing a bitstream that includes the visual media data according to a format rule, wherein
the bitstream includes coded information of a current block, the coded information indicating whether to apply a block-level super resolution coding mode to a first part of a coding unit (CU) in a current picture in the visual media data, wherein the block-level super resolution coding mode is applied by down-sampling the first block from a high spatial resolution to a low spatial resolution by an encoder; and
the format rule specifies that, when the coded information indicates that the block-level super resolution coding mode is applied to the first part of the CU block,
the first part of the CU including transform coefficients is inversely transformed into a down-sampled residual block having the low spatial resolution, and
a reconstructed block having the high spatial resolution that is higher than the low spatial resolution is generated using the block-level super resolution coding mode, by
determining at least one of a vertical scaling ratio or a horizontal scaling ratio corresponding to at least one of an activity level or a directionality of the first part of the CU,
up-sampling the down-sampled residual block to generate a residual block having the high spatial resolution based on the at least one of the determined vertical scaling ratio or horizontal scaling ratio, and
adding the residual block having the high spatial resolution to a reference block for the first part of the CU,
wherein the block-level super resolution coding mode is not applied to a second part of the CU in the current picture that is different from the first part of the CU.

11. The method of claim 10, wherein
the coded information indicates whether to apply the block-level super resolution coding mode to each of the first part of the CU and the second part of the CU.

12. The method of claim 10, wherein the coded information indicates whether to apply the block-level super resolution coding mode to the coding unit (CU), a coding block (CB), a superblock, a prediction block (PB), a transform block (TB), a tile, a coded-segment, a frame, or a sequence that includes the first block.

13. The method of claim 10, wherein the format rule further specifies that:
the reconstructed block is generated by adding corresponding sample values of the obtained residual block and the reference block, the reference block having the high spatial resolution.

14. The method of claim 10, wherein the format rule further specifies that:
for each CU in the current picture, a determination is performed to determine whether to apply the block-level super resolution coding mode to the respective CU.

* * * * *